(12) United States Patent
Grüner et al.

(10) Patent No.: US 10,947,391 B2
(45) Date of Patent: *Mar. 16, 2021

(54) GOLD-COLOURED EFFECT PIGMENTS HAVING HIGH CHROMA AND HIGH BRILLIANCY, METHOD FOR THE PRODUCTION AND USE THEREOF

(71) Applicant: Eckart GmbH, Hartenstein (DE)

(72) Inventors: Michael Grüner, Auerbach (DE); Günter Kaupp, Neuhaus (DE); Ralph Schneider, Lauf (DE)

(73) Assignee: Eckart GmbH

( * ) Notice: Subject to any disclaimer, the term of this patent is extended or adjusted under 35 U.S.C. 154(b) by 0 days.

This patent is subject to a terminal disclaimer.

(21) Appl. No.: 15/536,364

(22) PCT Filed: Dec. 21, 2015

(86) PCT No.: PCT/EP2015/080863
§ 371 (c)(1),
(2) Date: Jun. 15, 2017

(87) PCT Pub. No.: WO2016/097418
PCT Pub. Date: Jun. 23, 2016

(65) Prior Publication Data
US 2017/0355855 A1  Dec. 14, 2017

(30) Foreign Application Priority Data
Dec. 19, 2014  (EP) .................................. 14199130

(51) Int. Cl.
*C09C 1/00*  (2006.01)

(52) U.S. Cl.
CPC ........ *C09C 1/0015* (2013.01); *C01P 2004/51* (2013.01); *C01P 2004/52* (2013.01);
(Continued)

(58) Field of Classification Search
CPC .............. C01P 2006/65; C01P 2006/66; C09C 1/0015; C09C 2200/1004; C09C 2200/102; C09C 2200/302
See application file for complete search history.

(56) References Cited

U.S. PATENT DOCUMENTS 3,087,828 A   4/1963  Linton et al.
3,711,308 A   1/1973  Brand et al.
(Continued)

FOREIGN PATENT DOCUMENTS

CA   2180669 A1   1/1997
CN   1519278 A    8/2004
(Continued)

OTHER PUBLICATIONS

U.S. Appl. No. 62/004,007, filed May 28, 2014.
(Continued)

*Primary Examiner* — Shuangyi Abu Ali
(74) *Attorney, Agent, or Firm* — The Webb Law Firm

(57) ABSTRACT

The present invention relates to gold-colored effect pigment including a nonmetallic substrate in platelet form and a coating applied thereto, wherein the coating includes at least one spacer layer. The invention further relates to a process for production of and to the use of the gold-colored effect pigment.

18 Claims, 5 Drawing Sheets

(52) U.S. Cl.
  CPC ...... C01P 2006/62 (2013.01); C01P 2006/63 (2013.01); C01P 2006/64 (2013.01); C01P 2006/65 (2013.01); C01P 2006/66 (2013.01); C09C 2200/102 (2013.01); C09C 2200/1004 (2013.01); C09C 2200/301 (2013.01); C09C 2200/302 (2013.01); C09C 2200/304 (2013.01); C09C 2200/306 (2013.01); C09C 2220/106 (2013.01)

(56) References Cited

U.S. PATENT DOCUMENTS

| | | |
|---|---|---|
| 4,086,100 A | 4/1978 | Esselborn et al. |
| 4,744,832 A | 5/1988 | Franz et al. |
| 5,017,207 A | 5/1991 | Watkinson et al. |
| 5,273,576 A | 12/1993 | Sullivan et al. |
| 5,302,199 A | 4/1994 | Prengel et al. |
| 5,344,486 A | 9/1994 | Mainz |
| 5,607,504 A | 3/1997 | Schmid et al. |
| 5,624,486 A | 4/1997 | Schmid et al. |
| 5,753,317 A | 5/1998 | Sullivan et al. |
| 5,759,257 A | 6/1998 | Ambrosius et al. |
| 5,958,125 A | 9/1999 | Schmid et al. |
| 6,000,804 A | 12/1999 | Kimura |
| 6,045,914 A | 4/2000 | Sullivan et al. |
| 6,113,873 A | 9/2000 | Tunashima et al. |
| 6,129,784 A | 10/2000 | Ikuta et al. |
| 6,261,469 B1 | 7/2001 | Zakhidov et al. |
| 6,280,520 B1 | 8/2001 | Andes et al. |
| 6,290,766 B1 | 9/2001 | DeLuca, Jr. et al. |
| 6,485,556 B1 | 11/2002 | DeLuca, Jr. |
| 6,517,763 B1 | 2/2003 | Zakhidov et al. |
| 6,569,529 B1 | 5/2003 | Phillips et al. |
| 6,579,355 B1 | 6/2003 | Schmidt et al. |
| 6,596,070 B1 | 7/2003 | Schmidt et al. |
| 6,599,355 B1 | 7/2003 | Schmidt et al. |
| 6,648,957 B1 | 11/2003 | Andes et al. |
| 6,656,259 B2 | 12/2003 | Pfaff et al. |
| 6,692,561 B1 | 2/2004 | Schoen et al. |
| 6,719,838 B2 | 4/2004 | Heider et al. |
| 6,777,085 B1 | 8/2004 | Argoitia et al. |
| 6,840,993 B2 | 1/2005 | Schmidt et al. |
| 7,169,222 B2 | 1/2007 | Bruckner et al. |
| 7,241,503 B2 | 7/2007 | Noguchi |
| 7,303,622 B2 | 12/2007 | Loch et al. |
| 7,413,599 B2 | 8/2008 | Henglein et al. |
| 7,604,862 B2 | 10/2009 | Ambrosius et al. |
| 7,993,443 B2 | 8/2011 | Fuller et al. |
| 7,993,444 B2 | 8/2011 | Fuller et al. |
| 8,007,583 B2 | 8/2011 | Fuller et al. |
| 8,383,531 B2 | 2/2013 | Fujiwara et al. |
| 8,383,532 B2 | 2/2013 | Fujiwara et al. |
| 8,500,901 B2 | 8/2013 | Rueger et al. |
| 8,585,818 B1 | 11/2013 | Jones |
| 8,715,407 B2 | 5/2014 | Schumacher et al. |
| 8,728,226 B2 | 5/2014 | Schumacher et al. |
| 8,728,227 B2 | 5/2014 | Schumacher et al. |
| 8,728,228 B2 | 5/2014 | Schumacher et al. |
| 9,051,471 B2 | 6/2015 | Gruner et al. |
| 9,663,661 B2 | 5/2017 | Kaupp et al. |
| 10,597,544 B2 | 3/2020 | Mathias et al. |
| 2002/0104461 A1 | 8/2002 | Schmidt et al. |
| 2002/0169244 A1 | 11/2002 | Ostertag et al. |
| 2003/0005859 A1 | 1/2003 | Andes et al. |
| 2003/0039836 A1 | 2/2003 | Pfaff et al. |
| 2003/0097965 A1* | 5/2003 | Heider .............. A61K 8/19 106/401 |
| 2003/0205170 A1 | 11/2003 | Schmidt et al. |
| 2003/0209169 A1 | 11/2003 | Andes et al. |
| 2004/0003758 A1 | 1/2004 | Bruckner et al. |
| 2004/0052743 A1 | 3/2004 | Schmidt et al. |
| 2004/0139889 A1 | 7/2004 | Zimmermann et al. |
| 2004/0144023 A1 | 7/2004 | Bruckner et al. |
| 2004/0166316 A1 | 8/2004 | Noguchi |
| 2004/0180010 A1 | 9/2004 | Andes et al. |
| 2006/0027140 A1 | 2/2006 | Kniess et al. |
| 2006/0042509 A1 | 3/2006 | Henglein et al. |
| 2006/0047018 A1 | 3/2006 | Li et al. |
| 2006/0225609 A1 | 10/2006 | Rueger et al. |
| 2006/0254315 A1 | 11/2006 | Winkler et al. |
| 2007/0104663 A1 | 5/2007 | Henglein et al. |
| 2007/0199478 A1 | 8/2007 | Schlegl et al. |
| 2007/0243149 A1 | 10/2007 | Hofacker et al. |
| 2008/0181921 A1 | 7/2008 | DeLuca |
| 2008/0274198 A1 | 11/2008 | Schweinfurth |
| 2009/0252772 A1 | 10/2009 | Henglein et al. |
| 2009/0264575 A1 | 10/2009 | Henglein et al. |
| 2010/0011992 A1 | 1/2010 | Bujard et al. |
| 2010/0047199 A1 | 2/2010 | Trummer et al. |
| 2010/0095868 A1 | 4/2010 | Kaupp et al. |
| 2010/0116169 A1 | 5/2010 | Kaupp et al. |
| 2010/0175587 A1 | 7/2010 | Rueger et al. |
| 2010/0297045 A1 | 11/2010 | Kaupp et al. |
| 2010/0322981 A1 | 12/2010 | Bujard et al. |
| 2011/0048276 A1 | 3/2011 | Schlegl et al. |
| 2011/0160389 A1 | 6/2011 | Bubat et al. |
| 2011/0226161 A1 | 9/2011 | Schumacher et al. |
| 2011/0251293 A1 | 10/2011 | Trummer et al. |
| 2011/0259243 A1 | 10/2011 | Schumacher et al. |
| 2011/0265689 A1 | 11/2011 | Schumacher et al. |
| 2011/0265690 A1 | 11/2011 | Schumacher et al. |
| 2011/0306678 A1 | 12/2011 | Weizhong et al. |
| 2013/0149363 A1 | 6/2013 | Schmidt et al. |
| 2013/0164356 A1 | 6/2013 | Pfaff et al. |
| 2013/0216597 A1 | 8/2013 | Mathias et al. |
| 2014/0018439 A1 | 1/2014 | Gruner et al. |
| 2014/0165878 A1 | 6/2014 | Chang et al. |
| 2014/0251184 A1 | 9/2014 | McGuire et al. |
| 2015/0259536 A1 | 9/2015 | Gruner et al. |
| 2015/0344677 A1 | 12/2015 | Jones et al. |
| 2016/0185972 A1 | 6/2016 | Schmidt |
| 2017/0348201 A1* | 12/2017 | Gruner .............. C09C 1/0015 |

FOREIGN PATENT DOCUMENTS

| | | |
|---|---|---|
| CN | 1312840 | 9/2004 |
| CN | 101289580 | 10/2008 |
| CN | 102718229 A | 10/2012 |
| CN | 103183972 A | 7/2013 |
| CN | 104870571 A | 8/2015 |
| CN | 106536640 A | 3/2017 |
| DE | 1959998 A1 | 7/1971 |
| DE | 2522527 A | 12/1975 |
| DE | 19836810 A1 | 2/2000 |
| DE | 102010021530 A1 | 12/2011 |
| DE | 102011012214 A1 | 8/2012 |
| EP | 0289240 B1 | 4/1992 |
| EP | 0668329 A2 | 8/1995 |
| EP | 0708154 A2 | 4/1996 |
| EP | 0723997 A1 | 7/1996 |
| EP | 0753545 A2 | 1/1997 |
| EP | 0870730 A1 | 10/1998 |
| EP | 0950693 A1 | 10/1999 |
| EP | 1029900 A1 | 8/2000 |
| EP | 1121334 A1 | 8/2001 |
| EP | 1213330 A1 | 6/2002 |
| EP | 1251152 A1 | 10/2002 |
| EP | 1270682 A2 | 1/2003 |
| EP | 1281732 A1 | 2/2003 |
| EP | 1306412 A1 | 5/2003 |
| EP | 0948572 B1 | 7/2003 |
| EP | 1230310 B1 | 9/2003 |
| EP | 1114103 B1 | 10/2003 |
| EP | 1375601 A1 | 1/2004 |
| EP | 1422268 A2 | 5/2004 |
| EP | 1230308 B1 | 8/2004 |
| EP | 1474486 A2 | 11/2004 |
| EP | 1546063 A1 | 6/2005 |
| EP | 1553144 A1 | 7/2005 |
| EP | 1572812 A1 | 9/2005 |
| EP | 1621585 A2 | 2/2006 |
| EP | 1685198 B1 | 5/2007 |
| EP | 1980594 B1 | 6/2009 |
| EP | 0948572 B2 | 1/2010 |

(56) References Cited

FOREIGN PATENT DOCUMENTS

| | | |
|---|---|---|
| EP | 1829833 B1 | 1/2010 |
| EP | 1699884 B1 | 2/2010 |
| EP | 1025168 B2 | 8/2010 |
| EP | 1587881 B1 | 12/2010 |
| EP | 2217664 B1 | 6/2011 |
| EP | 2371908 A2 | 10/2011 |
| EP | 2508571 A1 | 10/2012 |
| EP | 2042474 B1 | 3/2013 |
| EP | 2576702 A1 | 4/2013 |
| EP | 2346949 B1 | 7/2013 |
| EP | 2346950 B1 | 7/2013 |
| EP | 2356181 B1 | 7/2013 |
| EP | 2367889 B1 | 7/2013 |
| EP | 2698403 A1 | 2/2014 |
| EP | 2318463 B1 | 10/2014 |
| EP | 2632988 B1 | 10/2014 |
| JP | 4949173 B | 12/1974 |
| JP | 51143027 | 12/1976 |
| JP | 5869258 A | 4/1983 |
| JP | 6234962 A | 2/1987 |
| JP | H5279594 A | 10/1993 |
| JP | 711161 A | 1/1995 |
| JP | 8259840 A | 10/1996 |
| JP | H8302236 A | 11/1996 |
| JP | H10101377 A | 4/1998 |
| JP | H1189734 A | 7/1999 |
| JP | H11217516 A | 8/1999 |
| JP | 2000081832 A | 3/2000 |
| JP | 2001520296 A | 10/2001 |
| JP | 2002509561 A | 3/2002 |
| JP | 2002522618 A | 7/2002 |
| JP | 2002537465 A | 11/2002 |
| JP | 2005307155 A | 4/2005 |
| JP | 2005515769 A | 6/2005 |
| JP | 2005521754 A | 7/2005 |
| JP | 2005264144 A | 9/2005 |
| JP | 2006160683 A | 6/2006 |
| JP | 2008230997 A | 10/2008 |
| JP | 2010507009 A | 3/2010 |
| JP | 2011504193 A | 2/2011 |
| JP | 2013520534 A | 6/2013 |
| JP | 2013544919 A | 12/2013 |
| JP | 2014527573 A | 10/2014 |
| WO | 9638505 B1 | 12/1996 |
| WO | 9746624 A1 | 12/1997 |
| WO | 0021905 A1 | 4/2000 |
| WO | 03006558 A2 | 1/2003 |
| WO | 2004031102 A1 | 4/2004 |
| WO | 2004055119 A1 | 7/2004 |
| WO | 2004087816 A1 | 10/2004 |
| WO | 2006021386 A1 | 3/2006 |
| WO | 2006136435 A2 | 12/2006 |
| WO | 2007115675 A2 | 10/2007 |
| WO | 2008077612 A2 | 7/2008 |
| WO | 2009144005 A1 | 12/2009 |
| WO | 2011147892 A1 | 12/2011 |
| WO | 2012130897 A1 | 10/2012 |
| WO | 2014053454 A1 | 4/2014 |
| WO | 2014094993 A1 | 6/2014 |
| WO | 2015183674 A1 | 12/2015 |

OTHER PUBLICATIONS

Byk-Gardner; Katalog; "Qualitatskontrolle tor Lacke and Kunststoffe" 2011/2012, pp. 97-98. In English and German.

U.S. Appl. No. 15/536,206, "Effect Pigments Having High Transparency, High Chroma and High Brilliancy, Method for the Production and Use Thereof", filed Dec. 21, 2015.

U.S. Appl. No. 15/536,220, "Effect Pigments with High Chroma and High Brilliancy, Method for the Production and Use Thereof", filed Dec. 21, 2015.

U.S. Appl. No. 15/536,945, "Metal Effect Pigments with High Chroma and High Brilliancy, Method for the Production and Use Thereof", filed Dec. 21, 2015.

U.S. Appl. No. 15/536,983, "Red-Coloured Decorative Pigments with High Chroma and High Brilliancy, Method for Their Production and Use of Same", filed Dec. 21, 2015.

* cited by examiner

→ Height $h_a$ of the spacer layer

→ 6/6 no spacer layer allowed
→ 2/6 to 5/6 spacer layer allowed
→ 1/6 no spacer layer allowed

GOLD-COLOURED EFFECT PIGMENTS HAVING HIGH CHROMA AND HIGH BRILLIANCY, METHOD FOR THE PRODUCTION AND USE THEREOF

CROSS-REFERENCE TO RELATED APPLICATIONS

The present application is the national phase of PCT/EP2015/080863 filed Dec. 21, 2015 and claims priority to European Patent Application No. 14199130.7 filed Dec. 19, 2014, the entire disclosures of which are hereby incorporated by reference herein.

BACKGROUND OF THE INVENTION

Field of the Invention

The present invention is directed to gold-colored effect pigments comprising a nonmetallic substrate in platelet form and a coating applied thereto, wherein the coating comprises at least one spacer layer, and to a process for production and to the use thereof.

Description of Related Art

Multilayer pigments based on a nonmetallic substrate in platelet form, which comprise at least one layer sequence composed of layers of alternately high, low and high refractive index, are known, for example, from EP 1 572 812 A1, EP 1 213 330 A1, EP 1 025 168 B2, EP 1 621 585 A2, EP 0 948 572 A1, EP 0 950 693 A1, EP 1 306 412 A1, EP 1 587 881 A2, EP 2 632 988 A1 or EP 1 474 486 A2. Depending on the optical layer thickness of the layer of low refractive index, it is possible for the multilayer pigments to have a significant color change according to the viewing angle, as described, for example, in EP 1 375 601 A1, EP 1 281 732 A1, EP 0 753 545 A2, US 2004/0003758 A1. A common factor in all the applications cited above is that the layer sequence includes a layer of low refractive index composed of a metal oxide of low refractive index, for example silicon oxide.

Compared to monolayer effect pigments with just a single identical first layer, multilayer pigments feature higher gloss and in some cases higher chroma, naturally assuming that the substrate and particle size here are the same.

EP 1 029 900 A1 discloses pigments which have been coated with (A) a pseudobrookite coating of high refractive index, consisting of a mixture of $TiO_2$ and $Fe_2O_3$ in a ratio of 10:1 to 1:3 and optionally one or more metal oxides in amounts of ≤20% by weight, based on the layer (A), (B) a colorless coating having a refractive index n≤1.8, and optionally an outer protective layer. The application does not contain any pointer to a spacer layer within or between layers (A) and (B).

EP 1 230 308 A1 discloses pigments including at least two layer sequences of (A) a colorless coating having a refractive index n≤1.8, (B) a coating of high refractive index composed of pseudobrookite consisting of a mixture of $TiO_2$ and $Fe_2O_3$ in a ratio of 1:0.1 to 1:5 and optionally one or more metal oxides in amounts of ≤20% by weight, based on the layer (B), and optionally (C) an outer protective layer. EP 1 230 308 A1 does not give any pointer to a spacer layer within or between layers (A) and (B).

EP 1 230 310 A1 discloses pigments comprising a layer sequence composed of (A) a coating of high refractive index, consisting of a mixture of $TiO_2$ and $Fe_2O_3$ in a ratio of 1:0.1 to 1:5 and optionally one or more metal oxides in amounts of ≤20% by weight, based on the layer (A), (B) a colorless coating having a refractive index n≤1.8, (C) a colorless coating having a refractive index n>1.8, (D) an absorbent coating having a refractive index n>1.8, and optionally (E) an outer protective layer. There is no description of a spacer layer within or between the aforementioned layers in EP 1 230 310 A1.

WO 2014/094993 A1 discloses interference pigments based on multiply coated substrates in platelet form which have, on the surface of the substrate, a layer sequence composed of (A0) optionally a layer of $TiO_2$, (A) a coating consisting of a mixture of $TiO_2$ and $Fe_2O_3$ which may optionally have been doped with one or more further oxides, (B) a layer composed of $SnO_2$, (C) a coating of high refractive index that absorbs in the visible wavelength range and optionally (D) an outer protective layer. In layer (A) and/or (C) the mixing ratio of $TiO_2$ to $Fe_2O_3$ is preferably 10:1 to 1:3. To increase the color intensity of the layer (A) and/or the layer (C), it is also possible to mix one or more oxides, for example $Al_2O_3$, $Ce_2O_3$, $B_2O_3$, $ZrO_2$, $SnO_2$, into the $TiO_2/Fe_2O_3$ mixture. WO 2014/094993 A1 does not disclose a spacer layer within or between the above-described layers.

CN 101289580 A describes the production of golden pigments having a strong interference color, the pigments being said to have the appearance of 24K gold. In this case, a mica substrate is suspended in water and a solution of $TiCl_4$ is added for coverage with a first layer, a solution of $FeCl_3$ and $TiCl_4$ for coverage with a second layer, a solution of $SnO_2$ for coverage with a third layer, and a solution of $TiCl_4$ for coverage with a fourth layer. After filtration and washing, the pigment is dried at 120 to 200° C. and calcined at 820° C. CN 101289580 A does not contain any pointer to a spacer layer in the coating.

EP 1 422 268 A2 discloses a pigment with multilayer structure, said pigment having two or more metal oxide layers, wherein the at least one metal (ion) of the metal oxide layer is selected from the group consisting of cerium, tin, titanium, iron, zinc and zirconium. The aim of this application is pigments having high chroma and high brilliance, and having a minimum number of pores of minimum size in their coating. According to EP 1 422 268 A2, a low pore volume is said to assure a coating of high visual quality.

US 2015/0344677 A1 relates to effect pigments based on coated substrates in platelet form. The coating comprises first and second layers of high refractive index, and a third component which is intended to diffuse partly or to an extent of 100% into one or both of the layers of high refractive index. The third component may be $SiO_2$ or another metal oxide. The aim of this application, in the case of effect pigments having a $D_{50}$ of 15 µm or less, is to obtain coverage with $SiO_2$ without agglomeration.

SUMMARY OF THE INVENTION

In some examples, there is provided a gold-colored effect pigment comprising a nonmetallic substrate in platelet form and a coating applied to the substrate, wherein the coating comprises a) optionally a layer 1 comprising or consisting of at least one of tin oxide, tin hydroxide or tin oxide hydrate, b) a layer 2 comprising at least one of metal oxide, metal hydroxide or metal oxide hydrate, where the metal ion comprises or is at least one metal ion selected from the group of metals consisting of Fe, Sn, Ti and Zr, and c) a layer 3 comprising at least one of metal oxide, metal hydroxide or metal oxide hydrate, where the metal ion comprises or is at least one metal ion selected from the group of metals consisting of Fe, Sn, Ti and Zr, at least one of layers 2 and 3 comprises at least two different metal ions and at least one of the two different metal ions is an iron ion, and layers 2 and 3 are interrupted by a spacer layer.

Also provided are processes for producing the gold-coloured effect pigment. Articles comprising at least one gold-coloured effect pigment of the present invention also are provided.

BRIEF DESCRIPTION OF THE DRAWINGS

The foregoing summary, as well as the following detailed description, will be better understood when read in conjunction with the appended drawings. In the drawings.

DETAILED DESCRIPTION

Figure 1:
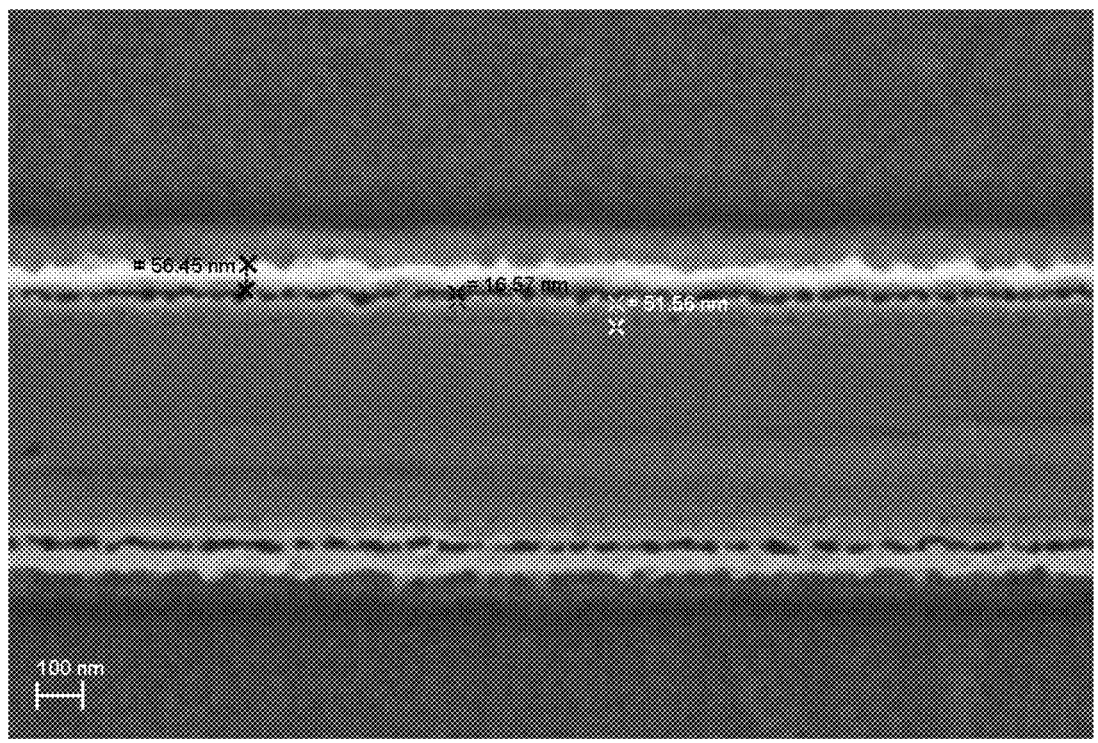
FIG. 1 is a scanning electron micrograph of a transverse section of an effect pigment of the invention in 50,000-fold magnification (based on Polaroid 545)

It was an object of the present invention to provide a high-chroma gold pigment having high gloss and high hiding power, which is visually indistinguishable from real gold, has high mechanical stability and high chemical stability and is simultaneously producible with low material input in a simple manner.

This object is achieved by providing a gold-colored effect pigment comprising a nonmetallic substrate in platelet form and a coating applied to the substrate, wherein the coating includes a) optionally a layer 1 comprising or consisting of tin oxide, tin hydroxide and/or tin oxide hydrate,
b) a layer 2 comprising at least one metal oxide, metal hydroxide and/or metal oxide hydrate, where the metal ion comprises or is at least one metal ion selected from the group of metals consisting of Fe, Sn, Ti and Zr,
c) a layer 3 comprising at least one metal oxide, metal hydroxide and/or metal oxide hydrate, where the metal ion comprises or is at least one metal ion selected from the group of metals consisting of Fe, Sn, Ti and/or Zr, at least one of layers 2 and 3 comprises at least two different metal ions and at least one of the two different metal ions is an iron ion, and layers 2 and 3 are interrupted by a spacer layer.

What is meant by "interrupted" in accordance with the invention is that layers 2 and 3 are spaced apart or kept at a distance from one another by the spacer layer.

What is meant by the general expression "metal oxide, metal hydroxide and/or metal oxide hydrate" in accordance with the invention is "metal oxide and/or metal hydroxide and/or metal oxide hydrate". This is also true when the metal or metal ion is specified, for example as titanium (ion), iron (ion), tin (ion), zirconium (ion) etc.

What is meant by the expression "a metal ion" or "an iron ion" in accordance with the invention is not one single metal ion or iron ion, but a multitude of metal ions or iron ions.

In a preferred embodiment, the optional layer 1 directly adjoins the nonmetallic substrate in platelet form, layer 2 directly follows layer 1 and layer 3 follows layer 2, with layers 2 and 3 interrupted by a spacer layer.

In a further-preferred embodiment, layer 2 directly adjoins the nonmetallic substrate in platelet form and layer 3 follows layer 2, with layers 2 and 3 interrupted by a spacer layer.

Preferred embodiments are specified in dependent claims 2 to 9.

The object is furthermore achieved by provision of a process for producing the gold-colored effect pigments of the invention, wherein the process comprises the following steps:

i. optionally applying an uncalcined layer comprising or consisting of tin oxide, tin hydroxide and/or tin oxide hydrate to the nonmetallic substrate in platelet form, ii. sequentially applying three uncalcined layers A, B and C each consisting of or comprising at least one metal oxide, metal hydroxide and/or metal oxide hydrate, where the metal ion comprises or is at least one metal ion selected from the group of metals consisting of Fe, Sn, Ti and Zr and where at least one of these metal ions is an iron ion, layers A, B and C are arranged directly one on top of another, and where the at least one metal oxide, metal hydroxide and/or metal oxide hydrate applied in the layer B, in relation to the metal ion, is different than the metal ion(s) of the metal oxides, metal hydroxides and/or metal oxide hydrates of layer A and layer C, iii. calcining the product obtained in step (ii) at a temperature from a range from 450° C. to 990° C. to obtain the gold-colored effect pigment comprising at least one spacer layer.

The object is alternatively achieved by provision of a process for producing the gold-colored effect pigments of the invention, wherein the process comprises the following steps:

i. sequentially applying two uncalcined layers B and C each consisting of or comprising at least one metal oxide, metal hydroxide and/or metal oxide hydrate to a calcined, singly or multiply coated nonmetallic substrate, where the metal ion comprises or is at least one metal ion selected from the group of metals consisting of Fe, Sn, Ti and Zr and where at least one of these metal ions is an iron ion, where layers B and C may be arranged directly one on top of another, and where the at least one metal oxide, metal hydroxide and/or metal oxide hydrate applied in layer B, in relation to the metal ion, is different than the metal ion(s) of the metal oxide, metal hydroxide and/or metal oxide hydrate of layer C and the layer that directly adjoins layer B in the substrate direction, ii. calcining the product obtained in step (i) at a temperature from a range from 450° C. to 990° C. to obtain the gold-colored effect pigment comprising at least one spacer layer.

A further object of the invention is the use of the gold-colored effect pigment of the invention in cosmetic formulations, plastics, films, textiles, ceramic materials, glasses, paints, printing inks, writing inks, varnishes, powder coatings and/or in functional applications, for example for laser marking, IR reflection, photocatalysis.

The object underlying the invention is furthermore achieved by provision of an article, wherein the article includes at least one gold-colored effect pigment of the invention.

The nonmetallic substrates in platelet form that are to be coated may be selected from the group consisting of natural mica platelets, synthetic mica platelets, glass platelets, iron oxide platelets, $SiO_2$ platelets, $Al_2O_3$ platelets, kaolin platelets, talc platelets and bismuth oxychloride platelets. According to the invention, the gold-colored effect pigments may also be based on mixtures of the above-specified nonmetallic substrates in platelet form. The aforementioned nonmetallic substrates in platelet form may also include one or more layers composed of or comprising at least one metal oxide, metal hydroxide and/or metal oxide hydrate of high and/or low refractive index and may have been calcined. For instance, the substrates used may thus also be pearlescent pigments or interference pigments. In the case of use of coated nonmetallic substrates in platelet form, the selection of this coating which is already present is made in accordance with the invention such that the effect pigments of the invention are gold in color. In a preferred embodiment, the substrates to be used in accordance with the invention are uncoated nonmetallic substrates in platelet form, that are essentially transparent, preferably transparent.

The nonmetallic substrates in platelet form are preferably selected from the group consisting of natural mica platelets, synthetic mica platelets, glass platelets, $SiO_2$ platelets, $Al_2O_3$ platelets and mixtures thereof. The nonmetallic substrates in platelet form are more preferably selected from the group consisting of natural mica platelets, synthetic mica platelets, glass platelets and mixtures thereof. Very particularly preferred nonmetallic substrates in platelet form are synthetic mica platelets and/or glass platelets and mixtures thereof. Especially glass platelets are preferred as nonmetallic substrate in platelet form.

The glass platelets usable as substrate may, with regard to their composition, consist of silicate glass, such as soda-lime glass, lead crystal glass, E glass, A glass, C glass, ECR glass, Duran glass, window glass, laboratory glass, aluminosilicate glass or borosilicate glass. Preferably, the glass platelets have a composition corresponding to the teaching, especially corresponding to the main claim, of EP 1 980 594 B1, more preferably corresponding to the teaching, especially according to the respective main claim, of EP 1 829 833 B1 or EP 2 042 474 B1. The glass plates usable as substrate are preferably produced by the process described in EP 289 240 B1.

In a further embodiment, the glass platelets can be colored in a controlled manner in the course of their production by the addition of at least one inorganic colorant. Suitable colorants are those that do not break down at the particular melting temperature of the glass composition. The proportion of colorant here is preferably within a range from 0.1% by weight to 50% by weight in total, more preferably within a range from 1% by weight to 35% by weight in total and most preferably within a range from 5% by weight to 25% by weight in total, based in each case on the total weight of the glass composition. Suitable colorants are especially elemental noble metals, such as Au, Pd or Pt, the cations or complex anions of the elements Cu, Cr, Mn, Fe, Ti and/or Co, and mixtures of the colorants listed above.

In a further embodiment, the refractive index of the glass platelets usable as substrate is within a range from 1.45 to 1.80, preferably within a range from 1.50 to 1.70.

In a further embodiment, the substrates in platelet form, especially glass platelets, may be ensheathed by a layer comprising or consisting of silicon oxide, silicon hydroxide, silicon oxide hydrate. For example, the aforementioned coating, in the case of use of glass platelets, can protect the glass surface from chemical alteration, such as swelling, leaching of glass constituents or dissolution in aggressive acidic coverage solutions.

The synthetic mica platelets usable as substrate may have a composition according to the main claim of CN 102718229 A or according to the main claim of US 2014/0251184 A1. They may additionally be produced according to the details in EP 0 723 997 A1, page 3 to page 4.

The synthetic mica platelets usable as substrate are preferably fluorphlogopite of the formula $KMg_3AlSi_3O_{10}F_2$, $KMg_2½(Si_4O_{10})F_2$ or $NaMg_2½(Si_4O_{10})F_2$, especially fluorphlogopite of the formula $KMg_3AlSi_3O_{10}F_2$, which, according to x-ray fluorescence analysis (XRF), preferably has the constituents specified in table 1 as the respective metal oxide within the ranges listed therein.

TABLE 1

Preferred compositions of synthetic mica platelets according to XRF Composition of synthetic mica platelets, figures in % by weight, based in each case on the total weight of the synthetic mica platelets

| | |
|---|---|
| $SiO_2$ | 38 to 46 |
| $Al_2O_3$ | 10 to 14 |
| $K_2O$ | 9 to 13 |
| $Fe_2O_3$ | 0.01 to 0.25 |
| MgO | 26 to 34 |
| MnO | 0 to 0.05 |
| $Na_2O$ | 0 to 13 |

The mean thickness of the nonmetallic substrates in platelet form that are to be coated is preferably within a range from 50 nm to 5000 nm, more preferably within a range from 60 nm to 3000 nm and most preferably within a range from 70 nm to 2000 nm. The mean thickness is understood in accordance with the invention to mean the arithmetic mean, unless stated otherwise.

In one embodiment, the mean thickness for glass platelets as the nonmetallic substrate in platelet form that is to be coated is within a range from 750 nm to 1500 nm, preferably within a range from 850 nm to 1400 nm and more preferably within a range from 900 nm to 1300 nm.

Thinner substrates in platelet form lead to a lower overall thickness of the gold-colored effect pigments of the invention. Thus, likewise preferred as nonmetallic substrate in platelet form are glass platelets wherein the mean thickness is within a range from 50 nm to 700 nm, further preferably within a range from 101 nm to 600 nm, more preferably within a range from 160 nm to 500 nm and most preferably within a range from 200 nm to 400 nm.

In a further embodiment, the mean thickness of the natural or synthetic mica platelets as the nonmetallic substrate in platelet form that is to be coated is preferably within a range from 80 nm to 1300 nm, further preferably within a range from 90 nm to 1000 nm, more preferably within a range from 99 nm to 800 nm and most preferably within a range from 200 nm to 600 nm.

If nonmetallic substrates in platelet form are coated below a mean thickness of 50 nm with metal oxides of high refractive index, for example, extremely fracture-sensitive pigments are obtained, which can break up even on incorporation into the respective application medium, which in turn results in significant lowering of the gloss.

Above a mean layer thickness of 5000 nm, the pigments can become too thick overall. This is associated with a poorer specific hiding capacity, meaning that the area covered per unit weight of gold-colored effect pigment of the invention is lower. Moreover, such thick pigments have a lower degree of plane-parallel orientation to the substrate in the application medium. Poorer orientation in turn results in reduced gloss. With regard to tactile properties too, excessively thick effect pigments can be disadvantageous in an application.

In one embodiment, the relative standard deviation in the thickness distribution of the nonmetallic substrates in platelet form is 15% to 100%, preferably 17% to 70%, more preferably 19% to 61% and most preferably 21% to 41%. The relative standard deviation in [%] is the quotient of calculated standard deviation and mean thickness.

The mean thickness of the nonmetallic substrate in platelet form is determined, using a cured lacquer film in which the gold-colored effect pigments of the invention are aligned essentially plane-parallel to the substrate, according to the details below in section IIk "Determination of the mean thickness of the nonmetallic substrates in platelet form, the mean layer thickness of layers 2 and 3, the mean layer thickness of the overall coating, the mean height $h_a$ of the spacer layer and the mean height $h_H$ of the cavities". For this purpose, a transverse section of the cured lacquer film is examined under a scanning electron microscope (SEM), wherein the thickness of the nonmetallic substrate in platelet form is determined for at least 100 effect pigments and statistically averaged. According to the invention, the term "mean" always means the arithmetic mean, unless stated otherwise.

The scanning electron micrographs were obtained using transverse sections of the gold-colored effect pigments of the invention with the Supra 35 scanning electron microscope (from Zeiss).

The gold-colored effect pigments of the invention optionally comprise a layer 1 comprising or consisting of tin oxide, tin hydroxide and/or tin oxide hydrate. Layer 1 may optionally be present at least partly as a mixed layer with a layer directly adjoining layer 1, for example layer 2.

Layers 2 and 3 of the gold-colored effect pigments of the invention, after calcination, are preferably layers of high refractive index or are each a layer of high refractive index, wherein the refractive index is preferably n>1.8, more preferably n≥1.9 and most preferably n≥2.1. According to the invention, the selection of the at least two different metal ions in layers 2 and/or 3 is made such that the metal oxide(s), metal hydroxide(s) and/or metal oxide hydrate(s) that form therefrom in layers 2 or 3 preferably each has or have a refractive index of n>1.8.

What is meant by "at least two different metal ions" in accordance with the invention is that at least two metal ions of different elements are present, for example titanium and iron ions, or iron and tin ions, or zirconium and iron ions. The various metal ions may be present in layer 2 and/or layer 3 of the gold-colored effect pigment of the invention in a mixture of metal oxides and/or metal hydroxides and/or metal oxide hydrates and/or else in mixed oxides and/or mixed hydroxides and/or mixed oxide hydrates. Layer 2 and/or layer 3 may comprise or consist of this mixture of metal oxides and/or metal hydroxides and/or metal oxide hydrates and/or mixed oxides and/or mixed hydroxides and/or mixed oxide hydrates.

Preferably, in accordance with the invention, in the case of use of the metal ions of Ti and Fe in layer 2 and/or in layer 3, the component comprising iron ions in the respective layer is present in the calcined gold-colored effect pigment of the invention in the form of iron titanate, preferably in the form of pseudobrookite and/or pseudorutile.

The at least one metal oxide, metal hydroxide and/or metal oxide hydrate of layers 2 or 3 comprises at least two different metal ions selected from the group of metals consisting of Fe, Sn, Ti and Zr, where one of the two different metals is an iron ion. According to the invention, the selection of the at least two different metal ions and the proportion of iron ions should be made here such that the resulting effect pigments are gold in color. What is meant by "gold-colored effect pigments" in the context of this invention is that their hue angle $h^*_{15}$ in the CIE LCh color space is within a range from 45° to 135°, further preferably within a range from 60 to 120°, more preferably within a range from 70 to 110° and most preferably within a range from 75° to 105°. Preferably, the chroma $C^*_{15}$ within the aforementioned hue angle ranges is >15, more preferably >20 and most preferably >30.

The hue angle $h^*_{15}$ and the chroma $C^*_{15}$ are determined here using lacquer applications, on black/white hiding charts (Byko-Chart 2853, from Byk-Gardner), of a nitrocellulose lacquer (Erco 2615e bronze mixing lacquer colorless; from Maeder Plastiklack AG) which has been admixed with 6% by weight of the particular effect pigment of the invention, according to the details which follow in section IIb "Angle-dependent color measurements".

The CIE LCh color space is the CIELab color space, wherein the cylinder coordinates C* (chroma, relative color saturation, distance from the L axis) and h* (hue angle, angle of the hue in the CIELab color circle) are reported rather than the Cartesian coordinates a*, b*.

The hiding quotient $D_q$, defined as $$D_q = \frac{L^{*25}_{black}}{L^{*25}_{white}},$$

of the gold-colored effect pigments of the invention is preferably ≥0.41, further preferably ≥0.45, more preferably ≥0.50 and most preferably ≥0.55. The hiding quotient is determined here using lacquer applications, on black/white hiding charts (Byko-Chart 2853, from Byk-Gardner), of a nitrocellulose lacquer (Erco 2615e bronze mixing lacquer colorless; from Maeder Plastiklack AG) which has been admixed with 6% by weight of the particular effect pigment of the invention, according to the details which follow in section IIc "Comparison of hiding". $L^{*25}_{black}$ and $L^{*25}_{white}$ here are the brightness values measured at a measurement angle of 25° on black and white backgrounds of the black/white hiding charts, preferably with the BYK-mac multi-angle colorimeter from Byk-Gardner.

The content of iron oxide, iron hydroxide and/or iron oxide hydrate in the gold-colored effect pigment of the invention is preferably within a range from 1% by weight to 45% by weight, more preferably within a range from 3% by weight to 32% by weight and most preferably within a range from 4% by weight to 15% by weight, determined in each case by means of XRF, calculated in each case as the metal oxide and based in each case on the total weight of the gold-colored effect pigment of the invention.

According to the invention, the content of metal oxide, metal hydroxide and/or metal oxide hydrate in the gold-colored effect pigment of the invention, where the at least one metal ion comprises or is a metal ion from the group of metals consisting of Sn, Ti and Zr, is preferably within a range from 10% by weight to 75% by weight in total, further preferably within a range from 12% by weight to 70% by weight in total, more preferably within a range from 15% by weight to 65% by weight in total and most preferably within a range from 20% by weight to 60% by weight in total, and the content of iron oxide, iron hydroxide and/or iron oxide hydrate is preferably within a range from 1.5% by weight to 25% by weight, further preferably within a range from 2% by weight to 20% by weight, more preferably within a range from 2.5% by weight to 18% by weight and most preferably within a range from 3% by weight to 15% by weight, determined in each case by means of XRF, calculated in each case as the metal oxide, based in each case on the total weight of the gold-colored effect pigment. If only one or two of the metal oxides, metal hydroxides and/or metal oxide hydrates, where the at least one metal ion comprises or is a metal ion from the group of metals consisting of Sn, Ti and Zr, is present in one of layers 2 and 3, the ranges listed above apply correspondingly.

In one embodiment, the gold-colored effect pigments of the invention do not comprise any tin oxide, tin hydroxide and/or tin oxide hydrate in either of layers 2 and 3. In this case, the proportion of tin oxide, tin hydroxide and/or tin oxide hydrate in the gold-colored effect pigment is preferably within a range from 0.04% by weight to 1.5% by weight, more preferably within a range from 0.09% by weight to 1.3% by weight and most preferably within a range from 0.1% by weight to 0.9% by weight, determined in each case by means of XRF as tin dioxide and based in each case on the total weight of the gold-colored effect pigment of the invention.

In a preferred embodiment, at least one of layers 2 and 3 comprises metal oxides, metal hydroxides and/or metal oxide hydrates, where the metal ions of the metal oxides, metal hydroxides and/or metal oxide hydrates comprise or are the metals Ti and Fe, where the weight ratio of Ti to Fe, determined in each case by means of XRF and calculated in each case as the elemental metal, is preferably within a range from 1 to 20, further preferably within a range from 2 to 18, more preferably within a range from 3 to 16 and most preferably within a range from 4 to 15, and where the proportion of Fe, determined by means of XRF and calculated as the elemental metal, is preferably within a range from 2% by weight to 25% by weight, based on the total weight of the gold-colored effect pigment of the invention.

In a particularly preferred embodiment, at least one of layers 2 and 3 comprises metal oxides, metal hydroxides and/or metal oxide hydrates, where the metal ions of the metal oxides, metal hydroxides and/or metal oxide hydrates comprise or are the metals Sn and Fe, where the weight ratio of Sn to Fe, determined in each case by means of XRF and calculated in each case as the elemental metal, is preferably within a range from 1 to 20, further preferably within a range from 2 to 18, more preferably within a range from 3 to 16 and most preferably within a range from 4 to 15, and where the proportion of Fe, determined by means of XRF and calculated as the elemental metal, is preferably within a range from 3% by weight to 23% by weight, based on the total weight of the gold-colored effect pigment of the invention.

In a further particularly preferred embodiment, at least one of layers 2 and 3 comprises metal oxides, metal hydroxides and/or metal oxide hydrates, where the metal ions of the metal oxides, metal hydroxides and/or metal oxide hydrates comprise or are the metals Zr and Fe, where the weight ratio of Zr to Fe, determined in each case by means of XRF and calculated in each case as the elemental metal, is preferably within a range from 1 to 20, further preferably within a range from 2 to 18, more preferably within a range from 3 to 16 and most preferably within a range from 4 to 15, and where the proportion of Fe, determined by means of XRF and calculated as the elemental metal, is preferably within a range from 2.5% by weight to 21% by weight, based on the total weight of the gold-colored effect pigment of the invention.

If the at least one metal oxide, metal hydroxide and/or metal oxide hydrate from layers 2 and 3 comprises at least two different metal ions, where one of the two different metal ions is an iron ion, the two different metal ions are preferably either in homogeneous distribution in layers 2 and/or 3 or form a gradient therein. In exceptional cases, the at least two different metal ions may also be present in inhomogeneous distribution in layers 2 and/or 3.

In one embodiment, one of the two layers 2 and 3 comprises only one kind of metal ion, preferably selected from the group of metals consisting of Fe, Sn, Ti and Zr, further preferably consisting of Fe, Sn and Zr. Correspondingly, the respective other layer of the two layers 3 and 2 shows at least two different metal ions, preferably selected from the group of metals consisting of Fe, Sn, Ti and Zr, further preferably consisting of Fe, Sn and Zr.

In a preferred embodiment, both layer 2 and layer 3 comprise at least one metal oxide, metal hydroxide and/or metal oxide hydrate composed of or comprising at least two different metal ions, preferably selected from the group of metals consisting of Fe, Sn, Ti and Zr, where at least one of the two different metal ions in layer 2 and layer 3 is an iron ion.

In a further embodiment, the layers 2 and 3 interrupted by the spacer layer are identical in respect of the particular composition.

The metal oxide, metal hydroxide and/or metal oxide hydrate contents of the gold-colored effect pigments of the invention are determined as the respective metal oxide by means of x-ray fluorescence analysis (XRF) and can be calculated as the respective elemental metal. For this purpose, the gold-colored effect pigment is incorporated into a lithium tetraborate glass tablet, fixed in solid sample measuring cups and analyzed therefrom. The measuring instrument used is the Advantix ARL system from Thermo Scientific.

The mean layer thickness of layer 1 is preferably less than 10 nm, more preferably less than 5 nm and most preferably less than 3 nm, with layer 1 completely enclosing or incompletely enclosing the nonmetallic substrate in platelet form or an optionally present coating.

The mean layer thickness of each of layers 2 and 3 of the gold-colored effect pigments of the invention is preferably within a range from 50 nm to 180 nm, further preferably within a range from 60 nm to 170 nm, more preferably within a range from 65 nm to 160 nm and most preferably within a range from 70 nm to 150 nm.

In a preferred embodiment, the mean layer thickness of layers 2 and 3 is virtually the same.

What is meant by "virtually the same mean layer thickness" in accordance with the invention is that the quotient of the mean layer thickness of layer 2 and the mean layer thickness of layer 3 is preferably within a range from 0.5 to 2.1, further preferably within a range from 0.6 to 1.8, more preferably within a range from 0.7 to 1.4 and most preferably within a range from 0.8 to 1.2.

In a further embodiment, in the case of a different physical composition of layers 2 and 3, the respective optical layer thickness thereof is virtually the same, where the optical layer thickness of layers 2 and 3 may or may not follow the known lambda/4 rule. The optical layer thickness is defined as the product of refractive index and mean layer thickness of the respective layer.

The mean layer thickness of the overall coating of the gold-colored effect pigments of the invention is preferably ≤400 nm. The mean layer thickness of the overall coating is preferably within a range from 45 nm to 350 nm, more preferably within a range from 70 nm to 300 nm and most preferably within a range from 120 nm to 200 nm.

"Overall coating" is understood to mean the complete coating which proceeds from the substrate surface and extends perpendicularly therefrom in one direction.

In one embodiment, the relative standard deviation of the layer thickness distribution of each of layers 2 and 3 is 2% to 74%, preferably 3% to 63%, more preferably 4% to 57% and most preferably 5% to 49%, and the relative standard deviation of the layer thickness distribution of the overall coating is 0.3% to 31%, preferably 1% to 27%, more preferably 1.2% to 24% and most preferably 1.9% to 22%. The relative standard deviation in [%] is the quotient of calculated standard deviation and mean thickness.

The spacer layer between layers 2 and 3 is preferably arranged essentially parallel to the surface of the nonmetallic substrate in platelet form. What is meant by "essentially parallel" in the context of this invention is that, in a scanning electron micrograph of a transverse section, a regression line applied to a spacer layer, in relation to a regression line applied to the surface of the nonmetallic substrate in platelet form, has a slope of preferably close to 0.

Figure 7:
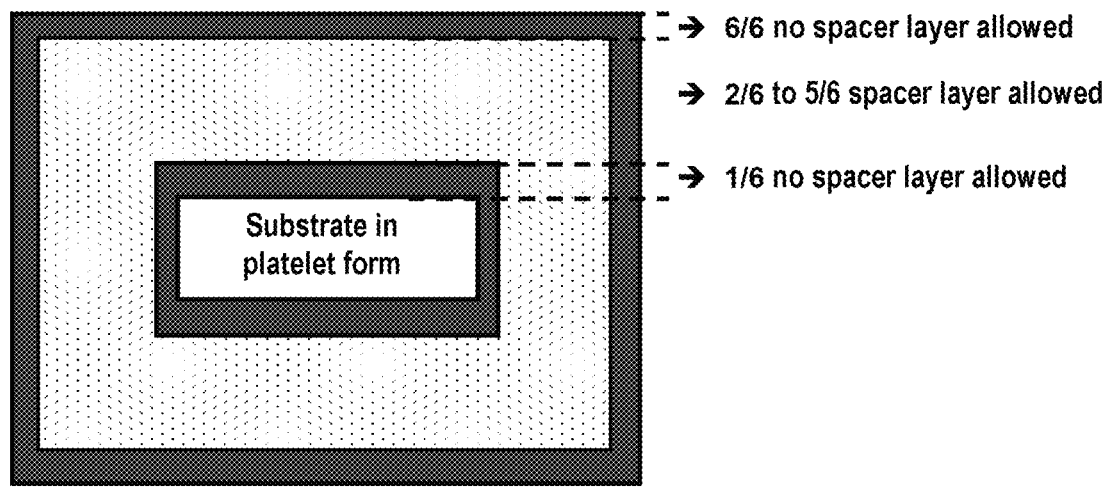
FIG. 7 is a schematic diagram of the position of the spacer layer.

The position of the spacer layer within the overall coating may vary. If, for example, the mean layer thicknesses of layers 2 and 3 are virtually identical, the spacer layer, in relation to the overall coating, preferably composed of optional layer 1 and layers 2 and 3, is in about the middle of the overall coating, since the optional layer 1 is preferably extremely thin, more preferably just a few atom layers thick. The spacer layer is preferably arranged between the first sixth and the sixth sixth of the overall coating in relation to the overall coating. The first sixth here refers to the proportion facing the nonmetallic substrate in platelet form, and the sixth sixth to the proportion of the overall coating, preferably composed of optional layer 1 and layers 2 and 3, remote from the nonmetallic substrate in platelet form (FIG. 7).

The spacer layer formed between layers 2 and 3 preferably has connections, which can also be referred to as spacers, which on the one hand connect the layers adjoining on either side of the spacer layer and on the other hand keep them spaced apart. As apparent from scanning electron micrographs of transverse sections, these connections or spacers, for example in the form of bars or columns, may be arranged at an angle of about 90°, for example of 80° to 100°, to the surface of the nonmetallic substrate in platelet form. However, they may also assume any other angle between 5° and 175°. Preferably, the spacers, especially bars, preferably the longitudinal axes of the spacers, preferably bars, are arranged at an angle from a range from 15° to 150° and more preferably at an angle from a range from 35° to 135°, in each case to the surface of the nonmetallic substrate in platelet form. In the determination of the angle, the substrate plane forms the first limb. One of the outsides of the bar in question in each case forms the second limb. The angle formed is determined proceeding from the angle vertex of the two limbs, with 0° being assumed to lie to the left and 180° to the right in the substrate plane in the top view of the scanning electron micrographs of transverse sections.

The connections or spacers may assume various geometric forms and are preferably distributed homogeneously over the full area of the entire spacer layer. For example, the connections or spacers may take the form of meshes, grids, ladders, sponges or honeycombs. It may also be possible to identify some structural elements similar to those in a photonic or inverse photonic crystal, as known, for example, from EP 2 371 908 A2, EP 1 546 063 A1 or EP 1 121 334 A1.

The connections or spacers comprise at least one metal oxide, metal hydroxide and/or metal oxide hydrate. In a preferred embodiment, the connections or spacers comprise an identical physical composition to the layers on either side of the spacer layer. It is also alternatively possible for a gradient between various metal oxides, metal hydroxides and/or metal oxide hydrates to be formed within the connections or spacers.

The inventors assume that the connections or spacers can also bring about mechanical stabilization of the adjoining layers and hence of the gold-colored effect pigment of the invention. Probably because of the number of connections or spacers, the different angles and geometric forms that the connections or spacers can assume within the spacer layer, and the distribution thereof in a preferably homogeneous manner over the full area of the spacer layer, a mechanically very stable effect pigment is formed. The adhesion between the overall coating and the nonmetallic substrate in platelet form is very good in the gold-colored effect pigments of the invention. Even extreme shear conditions as occur in what is called the Waring blender test are withstood by the gold-colored effect pigments of the invention without detectable damage. The procedure of the Waring blender test is described hereinafter in section IIf "Waring blender test".

As well as their surprisingly good mechanical stability, the gold-colored effect pigments of the invention have excellent chemical stability, as elucidated in the details below in section IIg "Determination of chemical stability".

Figure 6:
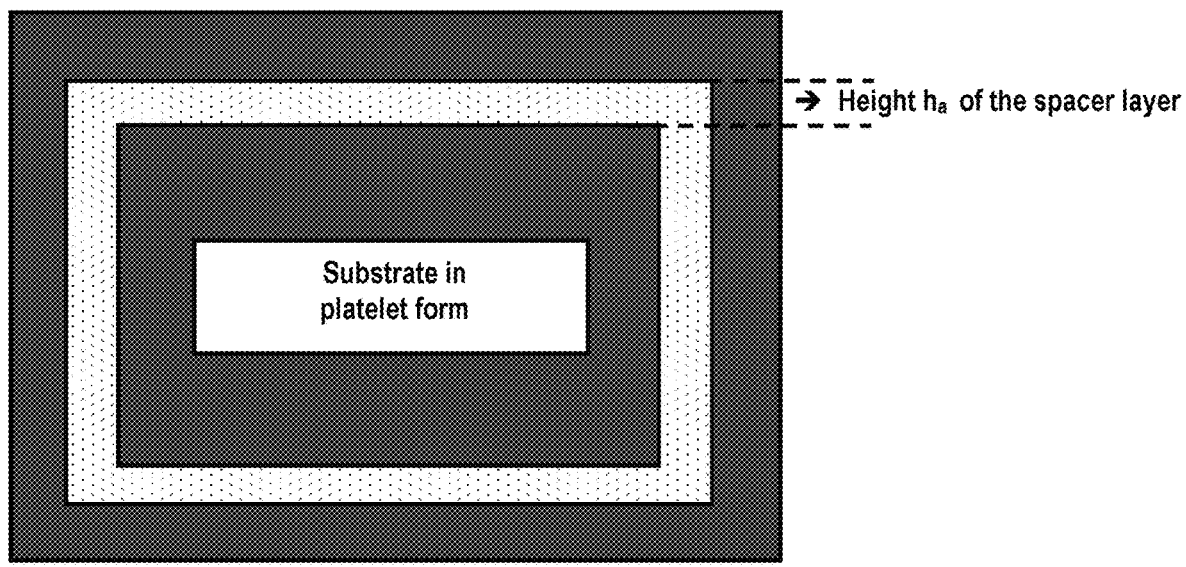
FIG. 6 is a schematic diagram of the spacer layer.

The spacer layer of the gold-colored effect pigments of the invention preferably has a mean height $h_a$ from a range from 5 nm to 120 nm, further preferably from a range from 10 nm to 105 mm, further preferably from a range from 16 nm to 90 nm, further preferably from a range from 21 nm to 76 nm, more preferably from a range from 22 nm to 67 nm and most preferably from a range from 26 nm to 60 nm (FIG. 6).

To determine the mean height $h_a$ of the spacer layer, the respective mean layer thickness of layer 2 and layer 3 and the mean layer thickness of the overall coating, scanning electron micrographs of transverse sections are used to establish the upper and lower substrate surfaces as baselines. What is meant by the upper and lower substrate surfaces in the scanning electron micrographs of transverse sections is the longer side of the nonmetallic substrate in platelet form in each case. The baseline is drawn onto the scanning electron micrograph of a transverse section along the surface of the nonmetallic substrate in platelet form.

The scanning electron micrographs of transverse sections are analyzed with the aid of the AxioVision 4.6.3 image processing software (from Zeiss).

Figure 4:
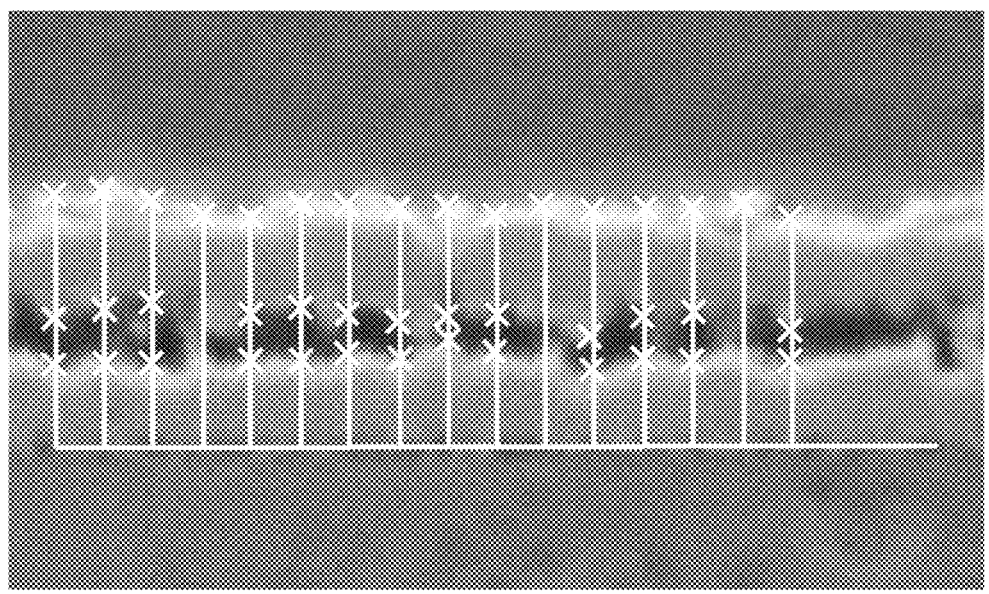
FIG. 4 is a detail of the scanning electron micrograph of a transverse section from FIG. 2 with a baseline drawn in at the interface of nonmetallic substrate in platelet form—coating, and lines arranged at right angles to the baseline. "x" marks the points of intersection at the interfaces.

A sufficient number of parallel lines are drawn at 50 nm intervals at a 90° angle with respect to the upper and lower baselines corresponding to the two surfaces of the substrate in platelet form that a grid has been placed over the effect pigment shown in the scanning electron micrograph of a transverse section (FIG. 4). The magnification of the scanning electron micrograph of a transverse section is preferably at least 50 000-fold, based on Polaroid 545 (4"×5"). Proceeding from the respective baseline of the nonmetallic substrate in platelet form, in the direction of the respective outer layer 3 or the respective outermost layer, the points of intersection between the parallel lines arranged at right angles to the respective baseline with the respective interfaces of the optional layer 1 with layer 2, of layer 2 with the spacer layer, of the spacer layer with layer 3, and of layer 3 with the environment or with any further layer applied are analyzed manually. It may be the case here that one of the lines drawn at 50 nm intervals occurs directly above a connection point or a spacer. In this case, only the respective point of intersection of the line at the interface of layer 3 with the environment or with any further layer applied is recorded.

These measurements give rise to the layer thicknesses of layers 2 and 3, the layer thickness of the overall coating, the layer thickness of further layers optionally present, and the height $h_a$ of the spacer layer by formation of differences. The layer thickness of layer 2 is calculated from the difference between the respective measured points of intersection at the respective interfaces of layer 2 with the spacer layer and of either optional layer 1 with layer 2 or the baseline with layer 2 if the nonmetallic substrate in platelet form has not been covered with further layers beforehand. The layer thickness of layer 3 is calculated from the difference between the respective measured points of intersection of layer 3 with the environment or any further layer applied and of the spacer layer with layer 3. The layer thickness of the overall coating is calculated from the difference between the respective points of intersection of layer 3 with the environment or any further layer applied with the environment and the respective baseline. The height $h_a$ of the spacer layer is calculated from the difference between the respective measured point of intersection of spacer layer with layer 3 and layer 2 with the spacer layer. The layer thicknesses of any further layers applied can be determined analogously and should be taken into account correspondingly in forming the differences.

The individual values of the layer thicknesses and the height $h_a$ that have been determined in this way are used to form the respective arithmetic means in order to determine the above-specified values for the mean layer thicknesses and the mean height $h_a$. To be statistically meaningful, the above-described measurements are conducted on at least 100 of the parallel lines arranged at right angles to the baselines.

In addition, with the aid of the above-described lines drawn at 50 nm intervals in a scanning electron micrograph, the number of connections or spacers per micrometer and the network density, defined as the number of connections or spacers per number of lines in %, is determined.

The height $h_{ma}$ refers to the midpoint of the spacer layer. It is calculated as the sum total of the layer thickness of the optional layer 1 and of layer 2 and half the height $h_a$ of the spacer layer. The relative height of the midpoint of the spacer layer $h_{Rma}$ is formed from the ratio of $h_{ma}$ and the layer thickness of the overall coating. The standard deviation of the relative height $\sigma h_{Rma}$ is preferably within a range from 0.2% to 18%, further preferably within a range from 0.3% to 15%, more preferably within a range from 0.4% to 11% and most preferably within a range from 0.5% to 8%. The standard deviation of the relative height $\sigma h_{Rma}$ is a measure of the extent to which the spacer layer is in a defined position parallel to the surface of the nonmetallic substrate in platelet form over the entire coating.

If the gold-colored effect pigments of the invention have at least one further spacer layer, the height $h_{ma}$ thereof and the relative height of the midpoint of the at least one further spacer layer $h_{Rma}$ thereof are also ascertained via the above-described method using scanning electron micrographs of transverse sections. The above-specified values for standard deviation of the relative height $\sigma h_{Rma}$ apply correspondingly to further spacer layers.

Figure 5:
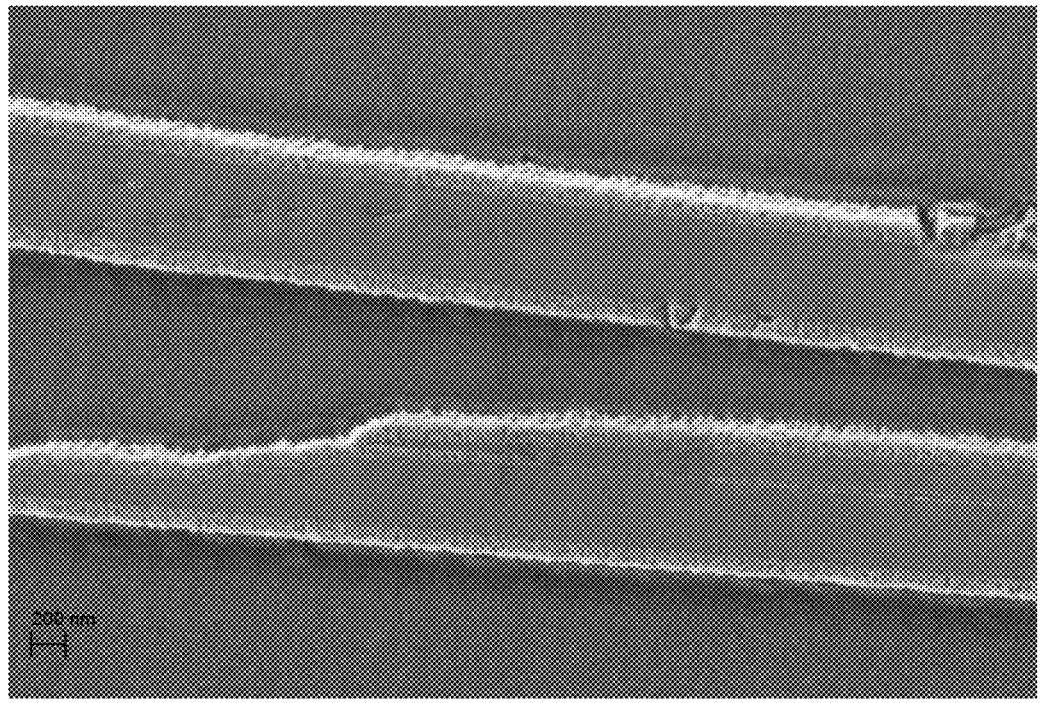
FIG. 5 is a scanning electron micrograph of a transverse section of the titanium dioxide-coated pearlescent pigment SYMIC C261 (from ECKART GmbH) in 20,000-fold magnification (based on Polaroid 545)

The person skilled in the art is aware that pearlescent pigments coated with titanium dioxide, for example, have pores in the coating that are statistically distributed over the entire coating (FIG. 5). These pearlescent pigments do not have a spacer layer. The spacer layer and the cavities present within the spacer layer in the gold-colored effect pigments of the invention, by contrast, are not statistically distributed over the entire coating, but are arranged parallel to the surface of the nonmetallic substrate in platelet form over the entire coating.

The distances of the midpoints of the statistically distributed pores from the substrate surface were likewise determined by means of scanning electron micrographs of transverse sections by the method described above. For this purpose, a sufficient number of parallel lines were drawn at 50 nm intervals at a 90° angle with respect to the upper and lower baselines corresponding to the two surfaces of the substrate in platelet form that a grid has been placed over the pearlescent pigments without a spacer layer shown in the scanning electron micrograph of a transverse section. If one of the parallel lines occurred above one or more pores, the height(s) thereof, the pore midpoint(s) thereof and the distance of the pore midpoint(s) from the substrate surface were determined. The statistical distribution of the pore midpoints can likewise be used to determine a standard deviation.

The standard deviation of the distances of the midpoints of the statistically distributed pores from the substrate surface is >20% in pearlescent pigments from the prior art, i.e. in the case of pearlescent pigments without a spacer layer. The standard deviation of the distances of the midpoints of the statistically distributed pores from the substrate surface is thus distinctly different in terms of its value from the standard deviation of the relative height of the midpoint of the spacer layer of the gold-colored effect pigments of the invention.

It is thus possible to compare the standard deviation of the distances of the pore midpoints from the substrate surface of pearlescent pigments without a spacer layer with the standard deviation of the relative height of the midpoint of the spacer layer of gold-colored effect pigments of the invention.

If the gold-colored effect pigments of the invention have more than one spacer layer within the overall coating, the method just described for measuring the individual layers and the spacer layers is applied correspondingly.

In one embodiment, the relative standard deviation in the height distribution of the spacer layer is 4% to 75%, preferably 7% to 69%, more preferably 9% to 63% and most preferably 13% to 60%. The relative standard deviation in [%] of the height distribution is the quotient of calculated standard deviation and the mean height.

In a preferred embodiment, the gold-colored effect pigments of the invention, within the at least one spacer layer, have a number of connections or spaces per micrometer from a range from 0 to 11, further preferably from a range from 0 to 9, more preferably from a range from 1 to 7 and most preferably from a range from 1 to 3.

In a preferred embodiment, the gold-colored effect pigments of the invention, within the at least one spacer layer, have a network density, defined as the number of connections or spacers per number of lines in percent, of <85%, preferably from a range from 1% to 75%, more preferably from a range from 1% to 63% and most preferably from a range from 1% to 49%.

Above a network density of 85%, in the context of this invention, reference is no longer made to a spacer layer since the high proportion of connections or spacers then leads to a very substantially continuous coating.

In a preferred embodiment, the gold-colored effect pigments of the invention comprise at least one spacer layer arranged essentially parallel to the surface of the nonmetallic substrate in platelet form, where the at least one spacer layer in each case has a mean height $h_a$ from a range from 19 nm to 83 nm, more preferably from a range from 27 nm to 66 nm and most preferably from a range from 33 nm to 57 nm.

In a particularly preferred embodiment, the gold-colored effect pigments of the invention have at least one spacer layer of mean height $h_a$ from a range from 16 nm to 79 mm, preferably from a range from 21 nm to 66 nm and most preferably from a range from 23 nm to 57 nm, where the number of connections or spacers per micrometer within the at least one spacer layer is selected from a range from 0 to 8, preferably from a range from 0 to 6, more preferably from a range from 1 to 5 and most preferably from a range from 1 to 4.

The spacer layer comprises cavities as well as the above-described connections or spacers. These cavities are spatially bounded by layers 2 and 3 and the compounds or spacers.

Energy-dispersive x-ray microanalysis (EDX analysis) of these cavities does not permit any conclusion as to whether the material is solid or liquid, and so the inventors are assuming, with the methods of analysis available at present, that the cavities within the spacer layer comprise a gas, probably air. The adjoining connections or spacers, by contrast, comprise at least one metal oxide, metal hydroxide and/or metal oxide hydrate, as detailed above.

The cavities within the spacer layer of the gold-colored effect pigments of the invention may assume a mean height $h_H$ from a range from 2 nm to 119 nm, preferably from a range from 6 nm to 105 nm, more preferably from a range from 11 nm to 85 nm and most preferably from a range from 18 nm to 53 nm. The height $h_H$ is understood to mean the greatest difference between the uppermost and lowermost cavity boundaries. It is determined by the method described above for the height $h_a$, by drawing parallel lines at 50 nm intervals at a 90° angle to the surface of the nonmetallic substrate in platelet form in scanning electron micrographs of transverse sections. The difference of the two points of intersection of these lines with the upper and lower cavity boundaries is the height $h_H$. Here too, to be statistically meaningful, the above-described measurements are conducted on at least 100 lines.

Therefore, the mean height $h_a$ is a maximum value for the mean height $h_H$. Accordingly, it is also possible for a plurality of cavities to be present one above another within the spacer layer.

The mean height of the spacer layer $h_a$, the mean layer thickness of layers 2 and 3, the mean layer thickness of the overall coating and the mean height of the cavities $h_H$ are determined, using a cured lacquer film in which the gold-colored effect pigments of the invention are aligned essentially plane-parallel to the substrate, according to the details given in section IIk "Determination of the mean thickness of the nonmetallic substrates in platelet form, the mean layer thickness of layers 2 and 3, the mean layer thickness of the overall coating, the mean height $h_a$ of the spacer layer and the mean height $h_H$ of the cavities". For this purpose, a transverse section of the cured lacquer film is examined under a scanning electron microscope (SEM), as described above for the mean height $h_a$, the mean layer thickness of layers 2 and 3, and the mean layer thickness of the overall coating.

As an alternative to these transverse sections, the gold-colored effect pigments of the invention can also be cut by means of the FIB method (FIB=focused ion beam). For this purpose, a fine beam of highly accelerated ions (for example gallium, xenon, neon or helium) is focused to a point by means of ion optics and guided line by line over the effect pigment surface to be processed. On impact with the effect pigment surface, the ions release most of their energy and destroy the coating at this point, which leads to removal of material line by line. It is also possible using the scanning electron micrographs that have then been recorded, by the method described above, to determine the mean height $h_a$, the mean layer thickness of layers 2 and 3 and the mean layer thickness of the overall coating. The mean thickness of the nonmetallic substrate in platelet form can also be determined using scanning electron micrographs of the effect pigments that have been cut by the FIB method.

In a further embodiment, the gold-colored effect pigments of the invention comprise, within the spacer layer, distributed over the entire effect pigment, measured using scanning electron micrographs of transverse sections, an area proportion of cavities from a range from 51% to 99%, preferably from a range from 63% to 96%, more preferably from a range from 76% to 95% and most preferably from a range from 84% to 94%, and connections or spacers within a proportion from a range from 1% to 49%, preferably from a range from 4% to 37%, more preferably from a range from 5% to 24% and most preferably from a range from 6% to 16%.

It is further preferable that the total volume occupied by the connections and spacers in the spacer layer is less than the total volume occupied by the cavities.

Preferably, the total volume occupied by the connections or spacers in the spacer layer is less than 50% by volume, further preferably less than 30% by volume, more preferably less than 20% by volume and most preferably less than 10% by volume of the total volume occupied by the cavities.

In the gold-colored effect pigments of the invention, the cavities within the spacer layer, by contrast with the pores of the teaching according to EP 1 422 268 A2, are explicitly desired. According to EP 1 422 268 A2, a coating with low porosity and a minimum number of pores is required to obtain pigments having high chroma and high brilliance. The pigments according to EP 1 422 268 A2 do not have a spacer layer. According to the invention, the cavities that are not distributed randomly within the overall coating but are present essentially parallel to the surface of the nonmetallic substrate in platelet form within the spacer layer do not have any adverse effect on the optical properties of the gold-colored effect pigments of the invention. On the contrary, the gold-colored effect pigments of the invention, compared to pigments with a single layer coating, feature higher gloss and higher chroma, naturally assuming the same nonmetallic substrate in platelet form, the same particle size and an identical first coating.

The higher gloss and the higher chroma can be explained in that the difference in refractive index between the spacer layer and the adjoining layers is at a maximum, which, according to Fresnel's law, leads in each case to a maximum reflection of light at these interfaces. For the cavities, the basis used here is the refractive index of air of approximately 1. A light beam hitting the spacer layer is partly reflected at the interfaces thereof, the respective intensity of the reflection according to Fresnel's law being dependent on the difference in refractive index of the adjoining layers from the spacer layer. Since such partial reflection takes place at every single interface, the total reflection also increases with the number of interfaces. In gold-colored effect pigments of the invention, a light beam is thus partly reflected on multiple occasions, the effect of which is much more intense gloss and much greater intensity of the interference color compared to conventional, singly coated pigments.

If the cavities are statistically distributed within the overall coating, i.e. not essentially parallel to the nonmetallic substrate in platelet form, there will be a variation in the optical path length within the overall coating. The result of this is that the interference conditions are not adequately fulfilled and hence there will be no amplification or extinction.

The gloss of the gold-colored effect pigments of the invention is determined using white/black hiding cards with the aid of a Micro-Tri-Gloss gloss meter from Byk-Gardner, according to the details given hereinafter in section IId "Gloss measurements". The chroma of the gold-colored effect pigments of the invention is likewise determined using white/black hiding cards with the BYK-mac multi-angle colorimeter (from Byk-Gardner), according to the details given hereinafter in section IIb "Angle-dependent color measurements". Further optical effects, such as sparkles and graininess, are determined according to the details given hereinafter in section IIe "Effect measurements".

In one embodiment, the gold-colored effect pigments of the invention comprise, as well as the above-described layers 1, 2 and 3, further layers of high and/or low refractive index, which may be arranged, viewed from the nonmetallic substrate in platelet form, either below the optional layer 1 or layer 2 and/or above layer 3. These further layers may comprise metal oxides, metal hydroxides, metal oxide hydrates, where the metal ions of the metal oxides, metal hydroxides, metal oxide hydrates comprise or are at least one metal ion selected from the group of metals consisting of Ti, Fe, Sn, Zr, Ca, Ba, Zn and Ce, preferably selected from the group of metals consisting of Ti, Fe, Sn, Zr, Zn and Ce, more preferably selected from the group of metals consisting of Ti, Fe and Sn. Moreover, these further layers may comprise semitransparent metals selected from the group consisting of Ag, Al, Cr, Au, Pt, Pd, Cu, Zn and Ti, preferably selected from the group consisting of Ag, Au and Cu, the alloys of each and or mixtures thereof. Moreover, the proportion of at least one semitransparent metal, determined by means of XRF, preferably totals ≤10% by weight, and is more preferably within a range from 0.03% by weight to 5.3% by weight in total and most preferably within a range from 0.1% to 3.8% by weight in total, based in each case on the total weight of the gold-colored effect pigment.

In one embodiment, each of the layers of the gold-colored effect pigments of the invention may be provided with a dopant, where the dopant may comprise metal oxides, metal hydroxides and/or metal oxide hydrates, and the metal ions of the metal oxides, metal hydroxides and/or metal oxide hydrates comprise or are at least one metal ion selected from the group of metals consisting of Ca, Mg, Al, Ce, Zr or Sn, preferably Al, Zr or Sn. The portion of dopant preferably totals ≤1% by weight, more preferably totals ≤0.5% by weight and most preferably totals ≤0.2% by weight, based in each case on the total weight of the gold-colored effect pigments.

In a particularly preferred embodiment, the overall coating of the gold-colored effect pigments of the invention may, as well as the spacer layer, comprise at least one further spacer layer also arranged essentially parallel to the surface of the nonmetallic substrate in platelet form between layers 2 and 3. Preferably, the gold-colored effect pigments of the invention have not more than four spacer layers within the overall coating, since the optical quality thereof then decreases. According to the invention, even when the gold-colored effect pigment of the invention comprises more than one spacer layer, in relation to the overall coating, there is no spacer layer either in the first sixth or in the sixth sixth of the overall coating.

The gold-colored effect pigments of the invention may have any median particle size $D_{50}$. The $D_{50}$ values of the gold-colored effect pigments of the invention are preferably within a range from 3 μm to 350 μm. Preferably, the $D_{50}$ values of the gold-colored effect pigments of the invention are within a range from 4 μm to 211 μm, further preferably within a range from 6 μm to 147 μm, more preferably within a range from 7 μm to 99 μm and most preferably within a range from 8 μm to 56 μm.

Exceptionally preferably, the gold-colored effect pigments of the invention have a $D_{50}$ from a range from 3 μm to 15 μm or from a range from 10 μm to 35 μm or from a range from 25 μm to 45 μm or from a range from 30 μm to 65 μm or from a range from 40 μm to 140 μm or from a range from 135 μm to 250 μm.

The $D_{10}$ values of the gold-colored effect pigments of the invention preferably encompass a range from 1 μm to 120 μm. More preferably, the $D_{10}$ values of the gold-colored effect pigments of the invention are within a range from 1 μm to 5 μm or within a range from 5 μm to 25 μm or within a range from 10 μm to 30 μm or within a range from 20 μm to 45 μm or within a range from 25 μm to 65 μm or within a range from 75 μm to 110 μm.

The $D_{90}$ values of the gold-colored effect pigments of the invention preferably encompass a range from 6 μm to 500 μm. More preferably, the $D_{90}$ values of the gold-colored effect pigments of the invention are within a range from 8 μm to 250 μm or within a range from 10 μm to 150 μm or within a range from 40 μm to 70 μm or within a range from 68 μm to 110 μm or within a range from 120 μm to 180 μm or within a range from 400 μm to 490 μm.

The $D_{10}$, $D_{50}$ and $D_{90}$ of the cumulative frequency distribution of the volume-averaged size distribution function, as obtained by laser diffraction methods, indicate that, respectively, 10%, 50% and 90% of the effect pigments analyzed have a volume-average diameter less than or equal to the value specified in each case. In this context, the size distribution curve of the gold-colored effect pigments of the invention is determined using the Malvern Mastersizer 2000 instrument according to the manufacturer's instructions. The scattered light signals are evaluated by the Fraunhofer theory, which also includes diffraction and absorption characteristics of the particles.

In a preferred embodiment, the gold-colored effect pigments of the invention have a span ΔD, defined as $$\Delta D = \frac{D_{90} - D_{10}}{D_{50}},$$

from a range from 0.7 to 2.0, preferably from a range from 0.7 to 1.5, further preferably from a range from 0.8 to 1.3, more preferably from a range from 0.8 to 1.2 and most preferably from a range from 0.85 to 1.1. The advantages of a narrow size classification in relation to color purity and/or gloss of the resulting effect pigments are described, for example, in EP 2 217 664 A1, EP 2 346 950 A1, EP 2 356 181 A1, EP 2 346 949 A1, EP 2 367 889 A1.

The gold-colored effect pigments of the invention can be produced as follows:

suspending the nonmetallic substrates in platelet form in water at a temperature from a range from 50° C. to 100° C., optionally applying an uncalcined layer comprising or consisting of tin oxide, tin hydroxide and/or tin oxide hydrate by adding a water-soluble tin salt with simultaneous addition of a mineral alkali, sequentially applying three uncalcined layers A, B and C in the form of metal oxides, metal hydroxides and/or metal oxide hydrates, where the metal ion comprises or is a metal ion selected from the group of metals consisting of Fe, Sn, Ti and Zr and where the at least one of these metal ions is an iron ion, by sequential addition of three water-soluble metal salts, in each case with simultaneous addition of mineral alkali, where the second water-soluble metal salt—for production of layer B—is different in relation to the metal ion than the two other water-soluble metal salts for production of layer A and layer C, separating the coated substrates from the coating solution(s), and optionally washing and/or optionally drying the coated substrates, calcining the coated substrates at temperatures from a range from 450° C. to 990° C., preferably from a range from 625° C. to 890° C. and more preferably from a range from 750° C. to 860° C. to obtain the gold-colored effect pigments of the invention comprising at least one spacer layer.

In a preferred embodiment, the gold-colored effect pigments of the invention are produced by the above process.

The application, preferably deposition, of the respective metal oxides, metal hydroxides and/or metal oxide hydrates is preferably effected at a constant pH within a range from pH 1.4 to 10.0 depending on the metal salt.

In addition to the at least three sequentially applied, preferably deposited, metal oxides, metal hydroxides and/or metal oxide hydrates, it is of course also possible for further metal oxides, metal hydroxides and/or metal oxide hydrates to be applied beforehand and/or subsequently, such that further layers may be arranged beneath or above the layer sequence [optional layer 1/layer 2/spacer layer/layer 3].

In the course of calcining, there is surprisingly diffusion presumably of the metal ions present in the layer B into layer A and/or layer C to form mixed metal oxides and/or mixed metal hydroxides and/or metal oxide hydrates and/or mixtures of metal oxides and/or metal hydroxides and/or metal oxide hydrates in layer A and/or layer C. Because of the diffusion of the metal ions from layer B into layer A and/or layer C in the course of calcining, layers 2 and 3 of the invention and the intermediate spacer layer are formed, with at least one of the two layers 2 and 3 comprising at least two different metal ions. The originally three successively deposited layers A, B and C thus give rise, in the course of calcining, to layers 2 and 3 and the intermediate spacer layer, with at least one of the two layers 2 and 3 comprising at least two different metal ions, at least one of which is an iron ion.

It is assumed that the different mobility of the metal oxides, metal hydroxides and/or metal oxide hydrates with respect to one another in the course of calcining is one of the factors responsible for the formation of the spacer layer. In this context, the mobility of the metal ions present in layer B competes with the mobility of the metal ions present in layers A and/or C, assuming that the metal ions diffuse out of layer B into at least one of the adjoining layers A and/or C and the metal ions diffuse from at least one of layers A and/or C into layer B. The inventors are assuming at present that one of the possible explanations for the formation of the spacer layer consists therein, that the mobility of the metal ions present in layer B during the calcination is higher than the mobility of the metal ions present in layers A and/or C. Furthermore, it is assumed that a concentration gradient in relation to the metal ions promotes the formation of a spacer layer, i.e. when more mobile metal ions can diffuse out of layer B into one of the adjoining layers A and/or C than in the reverse direction. In summary, it has been found that the formation of a spacer layer is caused by a complex interplay of a wide variety of different further factors, for example entropic and/or enthalpic effects, during the calcination, but these have not yet been conclusively clarified. For the formation of at least one further spacer layer, the above considerations naturally apply correspondingly.

In a particularly preferred embodiment, the first and third of the three sequentially applied, preferably deposited, metal oxides, metal hydroxides and/or metal oxide hydrates comprise at least one metal ion selected from the group of metals consisting of Sn, Ti and Zr. The first and third metal oxide, metal hydroxide and/or metal oxide hydrate, after application, respectively produce layer A and layer C. The second of the third sequentially applied, preferably deposited, metal oxides, metal hydroxides and/or metal oxide hydrates produces the layer B and comprises at least one iron ion. In layer A and layer C, the metal oxides, metal hydroxides and/or metal oxide hydrates applied, preferably deposited, may be the same or different in relation to the metal ion(s).

In a preferred embodiment, the first and third of the three sequentially applied, preferably deposited, metal oxides, metal hydroxides and/or metal oxide hydrates each comprise at least one iron ion. The first and third metal oxide, metal hydroxide and/or metal oxide hydrate, after application, respectively produce layer A and layer C. The second of the three sequentially applied, preferably deposited, metal oxides, metal hydroxides and/or metal oxide hydrates produces the layer B and comprises at least one metal ion selected from the group of metals consisting of Sn, Ti and Zr.

Alternatively, the gold-colored effect pigments of the invention can be produced as follows:

suspending the calcined, singly or multiply coated nonmetallic substrates in platelet form in water at a temperature from a range from 50° C. to 100° C., sequentially applying two uncalcined layers B and C in the form of metal oxides, metal hydroxides and/or metal oxide hydrates, where the metal ion comprises or is at least one metal ion selected from the group of metals consisting of Fe, Sn, Ti and Zr and where at least one of these metal ions is an iron ion, by sequential addition of two water-soluble metal salts, in each case with simultaneous addition of mineral alkali, where the first water-soluble metal salt—for production of layer B—is different in relation to the metal ion than the other water-soluble metal salt for production of layer C and the layer that directly adjoins layer B in substrate direction, separating the coated substrates from the coating solution(s), and optionally washing and/or optionally drying the coated substrates, calcining the coated substrates at temperatures from a range from 450° C. to 990° C., preferably from a range from 625° C. to 890° C. and more preferably from a range from 750° C. to 860° C. to obtain the gold-colored effect pigments of the invention comprising at least one spacer layer.

Here too, the application, preferably deposition, of the respective metal oxides, metal hydroxides and/or metal oxide hydrates is preferably effected at a constant pH within a range from pH 1.4 to 10.0 depending on the metal salt.

It is suspected that, in the course of calcining, the metal ions present in the layer B diffuse at least into layer C to form mixed metal oxides and/or mixed metal hydroxides and/or metal oxide hydrates and/or mixtures of metal oxides and/or metal hydroxides and/or metal oxide hydrates in layer C. Because of the diffusion of the metal ions from layer B at least into layer C, the calcining forms layer 3 of the invention and the spacer layer. The originally two successively deposited layers B and C thus give rise, in the course of calcining, to layer 3 and the spacer layer, with at least layer 3 comprising at least two different metal ions. Layer 2 is already present here. Layer 2 refers to the outermost layer of the calcined, singly or multiply coated nonmetallic substrate in platelet form which is used as starting material.

Figure 8:
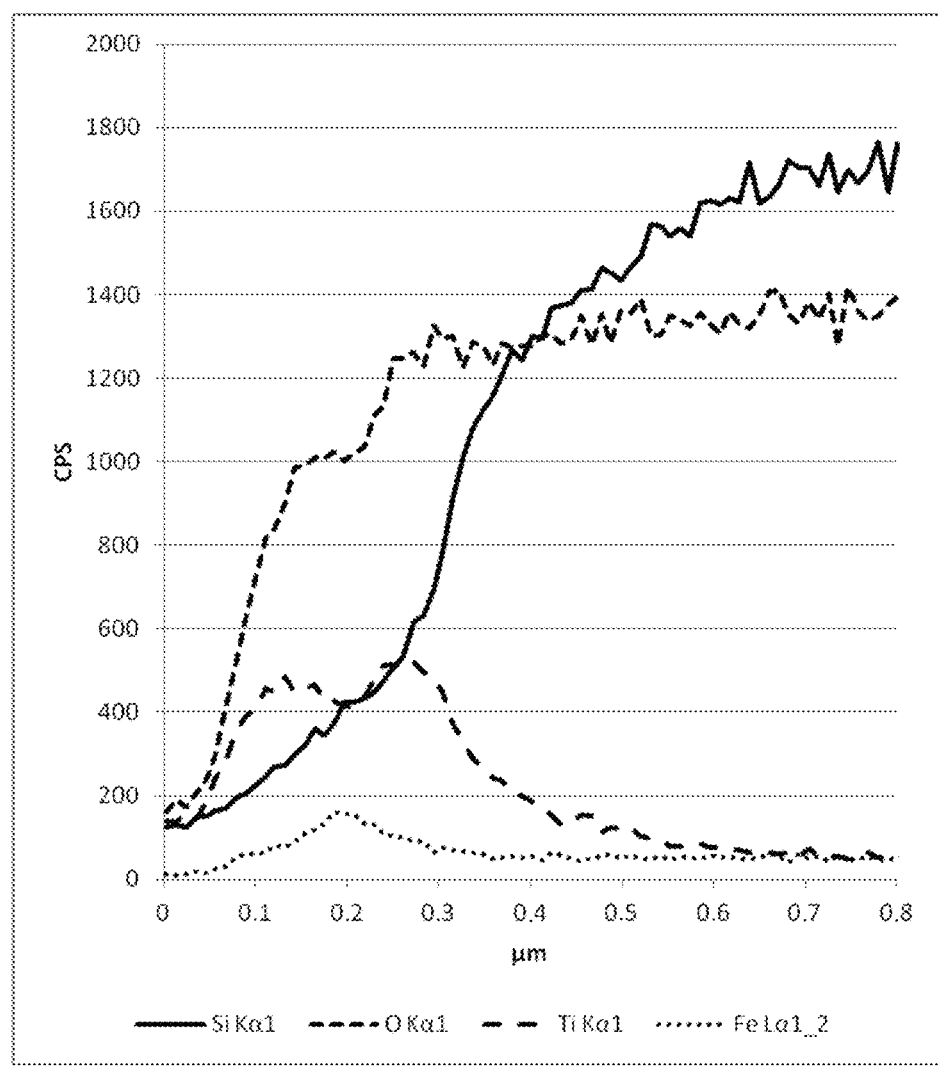
FIG. 8 is a concentration profile (line scan) using a transverse section in a scanning electron microscope with energy-dispersive microanalyzer (EDX) of example 9 prior to calcination.
Figure 9:
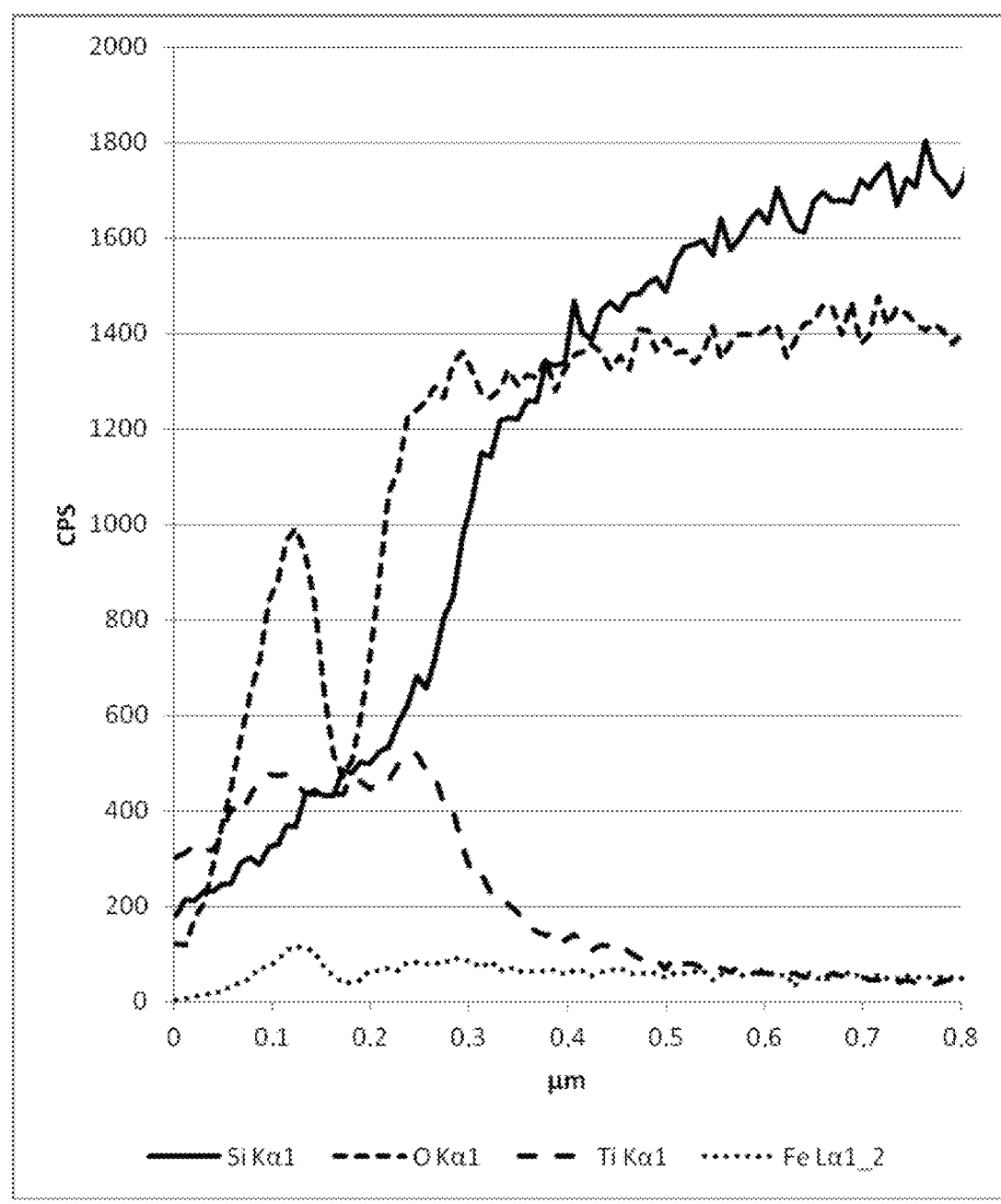
FIG. 9 is a concentration profile (line scan) using a transverse section in a scanning electron microscope with energy-dispersive microanalyzer (EDX) of example 9 after calcination.

The concentration profile (line scan) on the basis of transverse sections in the scanning electron microscope with an energy-dispersive microanalyzer (EDX) shows a significant location-dependent change in the chemical composition of the coating before and after calcination (FIGS. 8 and 9).

FIG. 8 shows a concentration profile of example 9 after coating and drying, but before calcination.

Using the concentration curves of Ti and Fe, it is possible to recognize the maxima in each case of the Ti- and Fe-containing layers. The concentration curve of oxygen, by contrast, has a substantially homogeneous distribution without recognizable minima or maxima.

FIG. 9 likewise shows a concentration profile of example 9 after coating and drying, but after calcination. It is found that the Fe maximum present in FIG. 9 has been reduced and shifted. The Fe ions have diffused into the surrounding Ti-containing layers. What should additionally be emphasized is a marked minimum in the oxygen concentration curve which clearly indicates the position of the spacer layer. At the same position, there are corresponding minima in the concentration curves of Ti and Fe.

In a particularly preferred embodiment, the two or three sequentially applied, preferably deposited, metal oxides, metal hydroxides and/or metal oxide hydrates for production of the layers B and C or A, B and C do not comprise any metal ion(s) selected from the group of the metals consisting of Si, Mg and Al.

In the case of sequential application of two uncalcined layers B and C to an already coated and optionally calcined substrate, that layer to which the layer B is applied, in accordance with the invention, comprises a metal oxide, metal hydroxide and/or metal oxide hydrate of high refractive index.

In the case of sequential application of three uncalcined layers A, B and C to an already coated and optionally calcined substrate, that layer to which the layer A is applied, in accordance with the invention, may comprises a metal oxide, metal hydroxide and/or metal oxide hydrate of high or low refractive index.

The above remarks are elucidated in detail hereinafter by way of example with reference to various coatings.

If, for example, a water-soluble titanium(IV) salt, a water-soluble iron(III) salt and a water-soluble titanium(IV) salt again are added successively to a suspension of an optionally coated nonmetallic substrate in platelet form, the subsequent calcination, viewed proceeding from the substrate in the SEM transverse section, following the coating which is optionally already present, gives rise to a layer 2 comprising a metal oxide, metal hydroxide and/or metal oxide hydrate, where the metal ions of the metal oxide, metal hydroxide and/or metal oxide hydrate comprise or are titanium ions and/or iron ions, a spacer layer, and a layer 3 comprising a metal oxide, metal hydroxide and/or metal oxide hydrate, where the metal ions of the metal oxide, metal hydroxide and/or metal oxide hydrate comprise or are titanium ions and/or iron ions. At least one of the layers comprising a metal oxide, metal hydroxide and/or metal oxide hydrate, where the metal ions of the metal oxide, metal hydroxide and/or metal oxide hydrate comprise or are titanium ions and/or iron ions, comprises an iron titanate, preferably pseudobrookite and/or pseudorutile.

If, for example, a water-soluble iron(III) salt, a water-soluble tin(IV) salt and a water-soluble titanium(IV) salt are added successively to a suspension of an optionally coated nonmetallic substrate in platelet form, the subsequent calcination, viewed proceeding from the substrate in the SEM transverse section, following the coating which is optionally already present, gives rise to a layer 2 comprising a metal oxide, metal hydroxide and/or metal oxide hydrate, where the metal ions of the metal oxide, metal hydroxide and/or metal oxide hydrate comprise or are iron ions and/or tin ions, a spacer layer, and a layer 3 comprising a metal oxide, metal hydroxide and/or metal oxide hydrate, where the metal ions of the metal oxide, metal hydroxide and/or metal oxide hydrate comprise or are tin ions and/or titanium ions.

If, for example, a water-soluble iron(III) salt is added to a suspension of an optionally coated nonmetallic substrate in platelet form and calcined following deposition of iron oxide, iron hydroxide and/or iron oxide hydrate, this product is resuspended after the calcination and a water-soluble tin(IV) salt and a water-soluble iron(III) salt again are added successively, another subsequent calcination, viewed proceeding from the substrate in the SEM transverse section, following the coating which is optionally already present and layer 2 comprising a metal oxide, metal hydroxide and/or metal oxide hydrate, where the metal ion of the metal oxide, metal hydroxide and/or metal oxide hydrate comprises or is iron ions, gives rise to a spacer layer and a layer 3 comprising a metal oxide, metal hydroxide and/or metal oxide hydrate, where the metal ions of the metal oxide, metal hydroxide and/or metal oxide hydrate comprise or are tin ions and/or iron ions.

If the gold-colored effect pigments of the invention, in addition to the at least two or three sequentially applied, preferably deposited, metal oxides, metal hydroxides and/or metal oxide hydrates, include further layers comprising metal oxides, metal hydroxides and/or metal oxide hydrates, it is also possible for further spacer layers to form within the further layers, provided that the process steps described above for the at least two or three sequentially applied, preferably deposited, metal oxides, metal hydroxides and/or metal oxide hydrates are observed.

In one embodiment, the calcination is effected under reducing conditions, preferably in the presence of forming gas ($N_2/H_2$). A calcination under reducing conditions can be associated with lower brightness values L* than is the case for calcination under air.

The gold-colored effect pigments of the invention may optionally be provided with at least one outer protective layer that further increases weathering stability and/or chemical stability and/or further reduces photoactivity. The UV stability and the condensate water stability were determined according to the details given below in the sections IIj "UV stability" and IIi "Condensate water test".

The optionally present protective layer comprises metal oxides, metal hydroxides and/or metal oxide hydrates wherein the metal ions are selected from the group of metals consisting of Si, Ce, Cr, Al, Zr, Zn and mixtures thereof, preferably from the group of metals Si, Ce, Al, Zr and mixtures thereof. In this context, the proportion of the optionally present protective layer is preferably within a range from 0.1% by weight to 7.0% by weight, more preferably within a range from 0.2% by weight to 5.2% by weight and most preferably within a range from 0.3% by weight to 3.1% by weight, based in each case on the total weight of the gold-colored effect pigment of the invention.

The optionally present protective layer may additionally have been surface modified, for example by silanes. The silanes may have no functional bonding group or one or more functional bonding group(s). Silanes having at least one functional bonding group are also referred to hereinafter as organofunctional silanes.

For example, one or more silanes may have been applied to this outermost protective layer. The silanes may be alkylsilanes having branched or unbranched alkyl radicals having 1 to 24 carbon atoms, preferably 6 to 18 carbon atoms.

In a further preferred embodiment, the silane without a functional bonding group is an alkylsilane. The alkylsilane preferably has the formula $R_{(4-z)}Si(X)_z$. In this formula, z is an integer from 1 to 3, R is a substituted or unsubstituted, unbranched or branched alkyl chain having 10 to 22 carbon atoms, and X is a halogen or alkoxy group. Preference is given to alkylsilanes having alkyl chains having at least 12 carbon atoms. R may also be bonded to Si in a cyclic manner, in which case z is typically 2.

In a further embodiment, it is also possible to use at least one organofunctional silane which enables a chemical bond to a plastic, or a binder of a lacquer or a paint, etc., for surface modification. The functional groups of the organofunctional silanes may also be referred to as coupling groups or functional bonding groups and are preferably selected from the group consisting of hydroxyl, amino, acryloyl, methacryloyl, vinyl, epoxy, isocyanate, cyano and mixtures thereof.

The organofunctional silanes having suitable functional groups that are used with preference as surface modifiers are commercially available and are produced, for example, by Evonik and sold under the "Dynasylan" trade name. Further products can be purchased from Momentive (Silquest silanes) or from Wacker, for example standard silanes and α-silanes from the GENIOSIL product group.

Examples of these are 3-methacryloyloxypropyltrimethoxysilane (Dynasylan MEMO, Silquest A-174NT), vinyltri(m)ethoxysilane (Dynasylan VTMO and VTEO, Silquest A-151 and A-171), methyltri(m)ethoxysilane (Dynasylan MTMS and MTES), 3-mercaptopropyltrimethoxysilane (Dynasylan MTMO; Silquest A-189), 3-glycidoxypropyltrimethoxysilane (Dynasylan GLYMO, Silquest A-187), tris[3-(trimethoxysilyl)propyl] isocyanurate (Silquest Y-11597), bis[3-(triethoxysilyl)propyl)] tetrasulfide (Silquest A-1289), bis[3-(triethoxysilyl)propyl disulfide (Silquest A-1589), beta-(3,4-epoxycyclohexyl) ethyltrimethoxysilane (Silquest A-186), bis(triethoxysilyl)ethane (Silquest Y-9805), gamma-isocyanatopropyltrimethoxysilane (Silquest A-Link 35, GENIOSIL GF40), methacryloyloxymethyltri(m)ethoxysilane (GENIOSIL XL 33, XL 36), (methacryloyloxymethyl) (m)ethyldimethoxysilane (GENIOSIL XL 32, XL 34), (isocyanatomethyl)methyldimethoxysilane, (isocyanatomethyl) trimethoxysilane, 3-(triethoxysilyl)propylsuccinic anhydride (GENIOSIL GF 20), (methacryloyloxymethyl) methyldiethoxysilane, 2-acryloyloxyethylmethyldimethoxysilane, 2-methacryloyloxyethyltrimethoxysilane, 3-acryloyloxypropylmethyldimethoxysilane, 2-acryloyloxyethyltrimethoxysilane, 2-methacryloyloxyethyltriethoxysilane, 3-acryloyloxypropyltrimethoxysilane, 3-acryloyloxypropyltripropoxysilane, 3-methacryloyloxypropyltriethoxysilane, 3-methacryloyloxypropyltriacetoxysilane, 3-methacryloyloxypropylmethyldimethoxysilane, vinyltrichlorosilane, vinyltrimethoxysilane (GENIOSIL XL 10), vinyltris(2-methoxyethoxy)silane (GENIOSIL GF 58), vinyltriacetoxysilane or mixtures thereof. Preference is given to using, as organofunctional silanes, 3-methacryloyloxypropyltrimethoxysilane (Dynasylan MEMO, Silquest A-174NT), vinyltri(m)ethoxysilane (Dynasylan VTMO and VTEO, Silquest A-151 and A-171), methyltri(m)ethoxysilane (Dynasylan MTMS and MTES), beta-(3,4-epoxycyclohexyl)ethyltrimethoxysilane (Silquest A-186), bis(triethoxysilyl)ethane (Silquest Y-9805), gamma-isocyanatopropyltrimethoxysilane (Silquest A-Link 35, GENIOSIL GF40), methacryloyloxymethyltri(m)ethoxysilane (GENIOSIL XL 33, XL 36), (methacryloyloxymethyl) (m)ethyldimethoxysilane (GENIOSIL XL 32, XL 34), 3-(triethoxysilyl)propylsuccinic anhydride (GENIOSIL GF 20), vinyltrimethoxysilane (GENIOSIL XL 10) and/or vinyltris (2-methoxyethoxy)silane (GENIOSIL GF 58).

It is also possible to apply other organofunctional silanes to the particles of the invention or the pigments of the invention.

In addition, it is possible to use aqueous prehydrolyzates commercially available, for example, from Degussa. These include aqueous aminosiloxane (Dynasylan Hydrosil 1151), aqueous amino-/alkyl-functional siloxane (Dynasylan Hydrosil 2627 or 2909), aqueous diamino-functional siloxane (Dynasylan Hydrosil 2776), aqueous epoxy-functional siloxane (Dynasylan Hydrosil 2926), amino-/alkyl-functional oligosiloxane (Dynasylan 1146), vinyl-/alkyl-functional oligosiloxane (Dynasylan 6598), oligomeric vinylsilane (Dynasylan 6490) or oligomeric short-chain alkyl-functional silane (Dynasylan 9896).

In a preferred embodiment, the organofunctional silane mixture, as well as at least one silane without a functional bonding group, comprises at least one amino-functional silane. The amino function is a functional group which can enter into one or more chemical interactions with most of the groups present in binders. This may include a covalent bond, for example with isocyanate or carboxylate functions of the binder, or hydrogen bonds such as with OH or COOR functions, or else ionic interactions. An amino function is therefore of very good suitability for the purpose of chemical attachment of the pigment to various kinds of binder.

Preference is given to taking the following compounds for this purpose: 3-aminopropyltrimethoxysilane (Dynasylan AMMO; Silquest A-1110), 3-aminopropyltriethoxysilane (Dynasylan AMEO), [3-(2-aminoethyl)aminopropyl]

trimethoxysilane (Dynasylan DAMO, Silquest A-1120), [3-(2-aminoethyl)aminopropyl]triethoxysilane, triamino-functional trimethoxysilane (Silquest A-1130), bis(gamma-trimethoxysilylpropyl)amine (Silquest A-1170), N-ethyl-gamma-aminoisobutyltrimethoxysilane (Silquest A-Link 15), N-phenyl-gamma-aminopropyltrimethoxysilane (Silquest Y-9669), 4-amino-3,3-dimethylbutyltrimethoxysilane (Silquest A-1637), ((cyclohexylamino)methyl)(diethoxy)methylsilane (GENIOSIL XL 924), N-cyclohexylaminomethyltriethoxysilane (GENIOSIL XL 926), N-(phenylaminomethyl)trimethoxysilane (GENIOSIL XL 973) or mixtures thereof.

In a preferred embodiment, the optionally present protective layer has the composition disclosed in the respective main claims of WO 2006/021386 A1, WO 2012/130897 A1 or WO 2014/053454 A1.

In addition, the gold-colored effect pigments of the invention may have been provided with a surface modification which, for example, facilitates the incorporation of the effect pigments into different media. In the case of use of the gold-colored effect pigments of the invention in powder coatings, for example, the effect pigments preferably have one of the surface modifications disclosed in the main claims of EP 2 698 403 A1 or of EP 2 576 702 A1. Alternatively, the gold-colored effect pigments of the invention may also have an outermost coating according to WO 2006/136435 A2, claim 32, which is preferably applied by the spray drying method according to WO 2006/136435 A2, claim 1.

In the case of use of the gold-colored effect pigments of the invention in cosmetic formulations, the incorporation thereof into O/W, W/O or W/Si emulsion systems can be facilitated by hydrophobic surface coverage, for example with Triethoxy Caprylylsilane (INCI), and more prolonged emulsion stability can be achieved.

The gold-colored effect pigments of the invention can also be used in mixtures with transparent and/or hiding (in)organic white, chromatic or black pigments and/or metal effect pigments and/or pearlescent pigments and/or fillers in the application desired in each case. The amount in which the gold-colored effect pigments of the invention are used depends on the particular application and on the optical effect to be achieved.

The gold-colored effect pigments of the invention can be used in cosmetic formulations, plastics, films, textiles, ceramic materials, glasses, paints, printing inks, writing inks, lacquers and powder coatings. In addition, the gold-colored effect pigments of the invention can also be used for functional applications, for example laser marking, greenhouse films or agricultural films.

In cosmetic formulations, for example body powder, face powder, pressed or loose powder, powder cream, eye makeup such as eyeshadow, mascara, eyeliner, liquid eyeliner, eyebrow pencil, lip balm, lipstick, lip gloss, lip liner, hair styling compositions such as hair spray, hair mousse, hair gel, hair wax, hair mascara, permanent or semipermanent hair dyes, temporary hair dyes, skincare compositions such as lotions, gels, emulsions, nail varnish compositions, it is possible to combine the gold-colored effect pigments of the invention with raw materials, auxiliaries and active ingredients suitable for the particular application. The total concentration of gold-colored effect pigments of the invention in the cosmetic formulation may be between 0.001% by weight for rinse-off products and 40.0% by weight for leave-on products, based in each case on the total weight of the formulation.

In a further embodiment, the gold-colored effect pigments of the invention may be in compact particulate form. Compact particulate form is understood to mean pellets in the form of preferably cylinders and/or beads. The cylinders here preferably have a diameter from a range from 0.2 cm to 4.2 cm, more preferably from a range from 0.5 cm to 2.3 cm and most preferably from a range from 0.7 cm to 1.7 cm, and preferably a length from a range from 0.2 cm to 7.1 cm, more preferably from a range from 0.6 cm to 5.3 cm and most preferably from a range from 0.8 cm to 3.7 cm. The beads preferably have a radius of 1 cm, more preferably from a range from 0.2 cm to 0.7 cm and most preferably from a range from 0.3 cm to 0.5 cm.

In a preferred embodiment, the present invention relates to a gold-colored effect pigment comprising a nonmetallic substrate in platelet form, preferably a synthetic mica platelet or a glass platelet, and a coating applied thereto, wherein the coating comprises
a) optionally a layer 1 comprising or consisting of tin oxide, tin hydroxide and/or tin oxide hydrate,
b) a layer 2 comprising at least one metal oxide, metal hydroxide and/or metal oxide hydrate, where the metal ion comprises or is at least one metal ion selected from the group of metals consisting of Ti and Fe,
c) a layer 3 comprising at least one metal oxide, metal hydroxide and/or metal oxide hydrate, where the metal ion comprises or is at least one metal ion selected from the group of metals consisting of Ti and Fe,
where at least one of layers 2 and 3 comprises at least one iron ion, where the iron content is within a range from 4% by weight to 19% by weight, the weight ratio of Ti to Fe is within a range from 3 to 10, determined in each case via XRF, calculated in each case as the metal oxide and based in each case on the total weight of the gold-colored effect pigment, layers 2 and 3 are interrupted by a spacer layer of mean height $h_a$ from a range from 21 nm to 76 nm and the gold-colored effect pigments have a span from a range from 0.9 to 1.3.

In a particularly preferred embodiment, the present invention relates to a gold-colored effect pigment comprising a nonmetallic substrate in platelet form, preferably a synthetic mica platelet or a glass platelet, and a coating applied thereto, wherein the coating comprises
a) optionally a layer 1 comprising or consisting of tin oxide, tin hydroxide and/or tin oxide hydrate,
b) a layer 2 comprising at least one metal oxide, metal hydroxide and/or metal oxide hydrate, where the metal ions comprise or are at least two metal ions selected from the group of metals consisting of Fe, Ti and Zr,
c) a layer 3 comprising at least one metal oxide, metal hydroxide and/or metal oxide hydrate, where the metal ions comprise or are at least two metal ions selected from the group of metals consisting of Fe, Ti and Zr,
where layers 2 and 3 comprise at least two different metal ions and at least one of the two different metal ions is an iron ion, layers 2 and 3 are interrupted by a spacer layer, and the content of tin oxide, tin hydroxide and/or tin oxide hydrate is within a range from 0% to 2% by weight, preferably within a range from 0.1% by weight to 1.6% by weight, further preferably within a range from 0.2% by weight to 1.3% by weight, more preferably within a range from 0.3% by weight to 1.2% by weight, and more preferably within a range from 0.4% by weight to 0.9% by weight, determined in each case by XRF, calculated in each case as tin dioxide and based in each case on the total weight of the gold-colored effect pigment.

In a particularly preferred embodiment, the present invention relates to a gold-colored effect pigment comprising a nonmetallic substrate in platelet form, preferably a synthetic mica platelet or a glass platelet, and a coating applied thereto, wherein the coating comprises a) optionally a layer 1 comprising or consisting of tin oxide, tin hydroxide and/or tin oxide hydrate,
b) a layer 2 comprising at least one metal oxide, metal hydroxide and/or metal oxide hydrate, where the metal ions comprise or are at least two metal ions selected from the group of metals consisting of Fe, Sn, Ti and Zr,
c) a layer 3 comprising at least one metal oxide, metal hydroxide and/or metal oxide hydrate, where the metal ions comprise or are at least two metal ions selected from the group of metals consisting of Fe, Sn, Ti and Zr, where layers 2 and 3 comprise at least two different metal ions and at least one of the two different metal ions is an iron ion, layers 2 and 3 are interrupted by a spacer layer, where the overall coating comprises further layers of high and/or low refractive index and the gold-colored effect pigment comprises at least one further spacer layer which runs essentially parallel to the surface of the nonmetallic substrate in platelet form and is of mean height $h_a$ from a range from 23 nm to 75 nm, preferably from a range from 26 nm to 57 nm.

In a preferred embodiment, the present invention relates to a gold-colored effect pigment comprising a nonmetallic substrate in platelet form, preferably a synthetic mica platelet or a glass platelet, and a coating applied thereto, wherein the coating comprises a) optionally a layer 1 comprising or consisting of tin oxide, tin hydroxide and/or tin oxide hydrate,
b) a layer 2 comprising at least one metal oxide, metal hydroxide and/or metal oxide hydrate, where the metal ion comprises or is at least one metal ion selected from the group of metals consisting of Ti and Fe,
c) a layer 3 comprising at least one metal oxide, metal hydroxide and/or metal oxide hydrate, where the metal ion comprises or is at least one metal ion selected from the group of metals consisting of Ti and Fe, where at least one of layers 2 and 3 comprises at least one iron ion, where the mean layer thickness of each of layer 2 and layer 3 is within a range from 30 nm to 370 nm and the quotient of the mean layer thickness of layer 2 and the mean layer thickness of layer 3 is within a range from 0.4 to 1.4.

In a particularly preferred embodiment, the present invention relates to a gold-colored effect pigment comprising a nonmetallic substrate in platelet form, preferably a synthetic mica platelet or a glass platelet, and a coating applied thereto, wherein the coating comprises a) optionally a layer 1 comprising or consisting of tin oxide, tin hydroxide and/or tin oxide hydrate,
b) a layer 2 comprising at least one metal oxide, metal hydroxide and/or metal oxide hydrate, where the metal ions comprise or are at least two metal ions selected from the group of metals consisting of Fe, Ti and Zr,
c) a layer 3 comprising at least one metal oxide, metal hydroxide and/or metal oxide hydrate, where the metal ions comprise or are at least two metal ions selected from the group of metals consisting of Fe, Ti and Zr, where layers 2 and 3 comprises at least two different metal ions and at least one of the two different metal ions is an iron ion, the quotient of the mean layer thickness of layer 2 and the mean layer thickness of layer 3 is within a range from 0.5 to 2.1 and the hue angle $h^*_{15}$ in the CIE LCh color space is within a range from 45° to 135°.

In a further embodiment, the present invention relates to a gold pigment comprising a nonmetallic substrate in platelet form, preferably a synthetic mica platelet or a glass platelet, and a coating applied thereto, where the coating is interrupted by at least one spacer layer essentially parallel to the surface of the nonmetallic substrate in platelet form and the effect pigment is obtainable by i) optionally applying an uncalcined tin oxide, tin hydroxide and/or tin oxide hydrate layer to the nonmetallic substrate in platelet form, ii) applying three uncalcined metal oxides, metal hydroxides and/or metal oxide hydrates, where the metal ion is a metal ion selected from the group of the metals Fe, Sn, Ti and Zr and where at least one of these metal ions is an iron ion, the uncalcined metal oxide, metal hydroxide and/or metal oxide hydrate to be applied second is physically different than the two others and is of such a nature that it can diffuse into at least one of the other uncalcined metal oxides, metal hydroxides and/or metal oxide hydrates, and iii) calcining the product obtained in step ii) at a temperature from a range from 430° C. to 930° C.

In a very particularly preferred embodiment, the present invention relates to a gold-colored effect pigment comprising a nonmetallic substrate in platelet form, preferably a synthetic mica platelet or a glass platelet, and a coating applied thereto, where the coating is interrupted by at least one spacer layer which is essentially parallel to the surface of the nonmetallic substrate in platelet form and is of mean height $h_a$ from a range from 22 nm to 61 nm, and the effect pigment is obtainable by i) optionally applying an uncalcined tin oxide, tin hydroxide and/or tin oxide hydrate layer using a water-soluble tin(IV) salt to the nonmetallic substrate in platelet form, ii) sequentially applying a first layer A using a water-soluble titanium(IV) salt, a second layer B using a water-soluble iron(III) salt and a third layer C using a water-soluble titanium(IV) salt, and iii) calcining the product obtained in step ii) at a temperature from a range from 690° C. to 910° C., where the weight ratio of Ti to Fe, determined by means of XRF, calculated as the elemental metal and based on the total weight of the effect pigment, is within a range from 1.5 to 24.

In one embodiment, the coating of the gold-colored effect pigments of the invention, rather than the at least one metal oxide, metal hydroxide and/or metal oxide hydrate, comprises the corresponding metal suboxides, metal fluorides, metal nitrides, metal oxynitrides, metal oxyhalides and/or metal sulfides.

In one embodiment, the coating of the gold-colored effect pigments of the invention comprises, in addition to the at least one metal oxide, metal hydroxide and/or metal oxide hydrate, at least one metal suboxide, metal fluoride, metal nitride, metal oxynitride, metal oxyhalide and/or metal sulfide.

There follows an elucidation of the invention by a few examples, but the examples do not restrict the invention. All % figures in the examples and comparative examples should be understood as % by weight.

I PRODUCTION OF THE GOLD-COLORED EFFECT PIGMENTS OF THE INVENTION

Example 1

200 g of synthetic mica platelets (fluorphlogopite platelets) having a particle size distribution according to MALVERN Mastersizer MS 2000: $D_{10}$=25 µm, $D_{50}$=55 µm, $D_{90}$=100 µm, span $\Delta D$=1.36 were suspended in 1300 mL of DM water (DM=demineralized) and heated to 85° C. with stirring. The pH of the suspension was lowered to pH 2.2. By addition of 100 g of a tin chloride solution of concentration c(Sn)=12 g/L, a layer of tin oxide was deposited on the surface of the synthetic mica platelets. Thereafter, the pH was lowered to pH 1.9 with dilute HCl, and then a solution of 250 mL of TiCl$_4$ (200 g of TiO$_2$/L of demineralized water) was dosed to the suspension. After the end of the addition, the mixture was stirred for a further 10 minutes and then the pH was adjusted to pH 2.6. Subsequently, 12 mL of an aqueous iron chloride solution having a density of 1.42 g/cm$^3$ were added therein. After completion of dosage, the mixture was stirred for another 10 minutes and, by addition of 100 mL of tin chloride solution of concentration c(Sn)=12 g/L, a further thin layer of tin oxide was deposited. Subsequently, 250 mL of a solution of TiCl$_4$ (200 g of TiO$_2$/L of demineralized water) were dosed to the suspension. Thereafter, 12 mL of an aqueous iron chloride solution having a density of 1.42 g/cm$^3$ were dosed after 10 minutes. 15 minutes after completion of addition, the suspension was filtered off and the filtercake was washed. The filtercake was dried and calcined at 900° C. for 60 minutes. Extremely chromatic, high-gloss gold-colored effect pigments were obtained.

Example 2

200 g of synthetic mica platelets (fluorphlogopite platelets) having a particle size distribution according to MALVERN Mastersizer MS 2000: D$_{10}$=10 µm, D$_{50}$=22 µm, D$_{90}$=40 µm were suspended in 1300 mL of demineralized water and heated to 85° C. with stirring. The pH of the suspension was lowered to pH 2.2. By addition of 60 g of a tin chloride solution of concentration c(Sn)=12 g/L, a layer of tin oxide was deposited on the surface of the glass platelets. The pH of the suspension was subsequently lowered to pH 1.9 and then a solution of 500 mL of TiCl$_4$ (200 g of TiO$_2$/L of demineralized water) were dosed into the suspension. After the end of the addition, the mixture was stirred for a further 10 minutes and then the pH was adjusted to pH 2.6. Subsequently, 65 mL of an aqueous iron chloride solution having a density of 1.42 g/cm$^3$ were added therein. After completion of dosage, the mixture was stirred for another 10 minutes, the pH was adjusted to pH 1.9, and 600 mL of a solution of TiCl$_4$ (200 g of TiO$_2$/L of demineralized water) were dosed into the suspension. Thereafter, a further addition of 35 mL of an aqueous iron chloride solution having a density of 1.42 g/cm$^3$ were dosed after 10 minutes. 15 minutes after the addition had ended, the suspension was filtered off and the filtercake was washed. The filtercake was dried and calcined at 850° C. for 60 minutes. Extremely chromatic, high-gloss gold-colored effect pigments with very good hiding capacity were obtained.

Example 3

200 g of glass platelets having a particle size distribution according to MALVERN Mastersizer MS 2000: D$_{10}$=34 µm, D$_{50}$=57 µm, D$_{90}$=96 µm were suspended in 1300 mL of demineralized water and heated to 85° C. with stirring. The pH of the suspension was lowered to pH 2.2. By addition of 75 g of a tin chloride solution of concentration c(Sn)=12 g/L, a layer of tin oxide was deposited on the surface of the glass platelets. Thereafter, the pH was lowered to pH 2.0 with dilute HCl, and then a solution of 148 mL of TiCl$_4$ (200 g of TiO$_2$/L of demineralized water) were added into the suspension. After the end of the addition, the mixture was stirred for a further 10 minutes and then the pH was adjusted to pH 2.6. Subsequently, 8 mL of an aqueous iron chloride solution having a density of 1.25 g/cm$^3$ were added. After completion of addition, the mixture was stirred for another 10 minutes and, by addition of 75 mL of tin chloride solution of concentration c(Sn)=12 g/L, a further thin layer of tin oxide layer were deposited. Subsequently, 180 mL of a solution of TiCl$_4$ (200 g of TiO$_2$/L of demineralized water) were dosed into the suspension. Thereafter, 20 mL of an aqueous iron chloride solution having a density of 1.25 g/cm$^3$ were dosed in after 10 minutes. 15 minutes after the last addition, the suspension was filtered off and the filtercake was washed. The filtercake was dried and calcined at 750° C. for 60 minutes. Extremely chromatic, high-gloss gold-colored effect pigments were obtained.

Example 4

200 g of synthetic mica platelets (fluorphlogopite platelets) having a particle size distribution according to MALVERN Mastersizer MS 2000: D$_{10}$=10 µm, D$_{50}$=22 µm, D$_{90}$=40 µm were suspended in 1300 mL of demineralized water and heated to 85° C. with stirring. The pH of the suspension was lowered to pH 1.9 and then a solution of 580 mL of TiCl$_4$ (200 g of TiO$_2$/L of demineralized water) were dosed into the suspension. After the end of the addition, the mixture was stirred for a further 10 minutes and then the pH was adjusted to pH 2.6. Subsequently, 80 mL of an aqueous iron chloride solution having a density of 1.25 g/cm$^3$ were dosed in. After completion of addition, the mixture was stirred for another 10 minutes, and, thereafter, 630 mL of a solution of TiCl$_4$ (200 g of TiO$_2$/L of demineralized water) were dosed into the suspension. Thereafter, a further addition of 70 mL of an aqueous iron chloride solution having a density of 1.25 g/cm$^3$ were dosed after 10 minutes. On completion of addition, the mixture was stirred for a further 10 minutes, and, thereafter, 300 mL of a solution of TiCl$_4$ (200 g of TiO$_2$/L of demineralized water) were dosed into the suspension. Thereafter, a further addition of 40 mL of an aqueous iron chloride solution having a density of 1.25 g/cm$^3$ were dosed in after 10 minutes. 15 minutes after the addition had ended, the suspension was filtered off and the filtercake was washed. The filtercake was dried and calcined at 850° C. for 60 minutes. Extremely chromatic, high-gloss gold-colored effect pigments with very good hiding capacity were obtained.

Example 5

200 g of synthetic mica platelets (fluorphlogopite platelets) having a particle size distribution according to MALVERN Mastersizer MS 2000: D$_{10}$=10 µm, D$_{50}$=22 µm, D$_{90}$=40 µm were suspended in 1300 mL of demineralized water and heated to 85° C. with stirring. The pH of the suspension was lowered to pH 2.6. Subsequently, 40 mL of an aqueous iron chloride solution having a density of 1.42 g/cm$^3$ were added in. Thereafter, the mixture was stirred for 10 minutes and, at pH 1.9, 560 mL of a solution of TiCl$_4$ (200 g of TiO$_2$/L of demineralized water) were added into the suspension. After adjusting the pH to the initial value, 40 mL of an aqueous iron chloride solution having a density of 1.42 g/cm$^3$ were then added to the suspension. Thereafter, at a pH of 1.9, 600 mL of a solution of TiCl$_4$ (200 g of TiO$_2$/L of demineralized water) were dosed into the suspension. A further addition of 15 mL of an aqueous iron chloride solution having a density of 1.42 g/cm$^3$ were dosed and then the mixture was stirred for a further 120 minutes and filtered. The washed filtercake was dried and calcined at 800° C. for 45 minutes. Extremely chromatic, high-gloss gold-colored effect pigments with very good hiding capacity were obtained.

Example 6

200 g of synthetic mica platelets (fluorphlogopite platelets) having a particle size distribution according to MALVERN Mastersizer MS 2000: $D_{10}$=10 μm, $D_{50}$=22 μm, $D_{90}$=40 μm were suspended in 1300 mL of demineralized water and heated to 85° C. with stirring. By addition of 75 g of a tin chloride solution of concentration c(Sn)=12 g/L at pH 2.2, a layer of tin oxide was deposited on the surface of the substrate. The pH of the suspension was lowered to pH 1.9 and then a solution of 500 mL of $TiCl_4$ (200 g of $TiO_2$/L of demineralized water) was dosed into the suspension. After the end of the addition, the mixture was stirred for a further 10 minutes and then the pH was adjusted to pH 2.6. Subsequently, 360 mL of an aqueous iron chloride solution having a density of 1.25 g/cm³ were added. On completion of added dosage, the mixture was stirred for another 10 minutes, and, thereafter, 500 mL of a solution of $TiCl_4$ (200 g of $TiO_2$/L of demineralized water) were added to the suspension. After the addition had ended, the mixture was stirred for another 2 hours, the suspension was filtered and the filtercake was washed. The filtercake was dried and calcined at 850° C. for 60 minutes. Extremely chromatic, high-gloss gold-colored effect pigments with very good hiding capacity were obtained.

Example 7

200 g of synthetic mica platelets (fluorphlogopite platelets) having a particle size distribution according to MALVERN Mastersizer MS 2000: $D_{10}$=5 μm, $D_{50}$=12 μm, $D_{90}$=25 μm were suspended in 1300 mL of demineralized water and heated to 85° C. with stirring. The pH of the suspension was lowered to pH 2.2. By addition of 70 g of a tin chloride solution of concentration c(Sn)=12 g/L, a layer of tin oxide was deposited on the surface of the glass platelets. The pH of the suspension was subsequently lowered to pH 1.8 and then a solution of 800 mL of $TiCl_4$ (200 g of $TiO_2$/L of demineralized water) was dosed into the suspension. After the end of the addition, the mixture was stirred for a further 10 minutes and then the pH was adjusted to pH 2.6. Subsequently, 100 mL of an aqueous iron chloride solution having a density of 1.42 g/cm³ were dosed in. After completion of added dosage, the mixture was stirred for another 10 minutes, the pH was adjusted to pH 1.8, and 400 mL of a solution of $TiCl_4$ (200 g of $TiO_2$/L of demineralized water) were dosed into the suspension. Thereafter, a further addition of 25 mL of an aqueous iron chloride solution having a density of 1.42 g/cm³ were dosed after 10 minutes. 15 minutes after the addition had ended, the suspension was filtered off and the filtercake was washed. The filtercake was dried and calcined at 880° C. for 45 minutes. Extremely chromatic, high-gloss gold-colored effect pigments with very good hiding capacity were obtained.

Example 8

100 g of the gold-colored effect pigment obtained in example 2 were suspended in 850 mL of demineralized water and heated to 85° C. with turbulent stirring. The pH was lowered to 4.2 with dilute hydrochloric acid. Then a solution consisting of 0.93 g of $Ce(NO_3)_3 \times 6\ H_2O$ dissolved in 40 mL of demineralized water was dosed in. At the same time, the pH was kept constant by dropwise addition of a 10% NaOH solution. Once the solution had been added completely, the mixture was stirred for a further 1 hour and the pH was adjusted thereafter to 10 with dilute sodium hydroxide solution. Thereafter, 5.7 g of Dynasylan 1146 diluted with 24.3 g of demineralized water were added to the suspension and the suspension was stirred for another 180 minutes and then filtered, and the filtercake was washed with demineralized water. The filtercake was dried at 95° C. under reduced pressure.

Example 9

300 g of glass platelets having a particle size distribution according to MALVERN Mastersizer MS 2000: $D_{10}$=10 μm, $D_{50}$=20 μm, $D_{90}$=40 μm were suspended in 1500 mL of demineralized water and heated to 85° C. with turbulent stirring. The pH of the suspension was lowered to pH 2.2. By addition of 70 mL of a tin chloride solution of concentration c(Sn)=12 g/L, a layer of tin oxide was deposited on the surface of the glass platelets. Thereafter, the pH was lowered to pH 2.0 with dilute HCl, and then a solution of 250 mL of $TiCl_4$ (200 g of $TiO_2$/L of demineralized water) was dosed into the suspension. After the end of the addition, the mixture was stirred for a further 10 minutes and then the pH was adjusted to pH 2.6. Subsequently, 100 mL of an aqueous iron chloride solution having a density of 1.25 g/cm³ were dosed. Subsequently, 300 mL of a solution of $TiCl_4$ (200 g of $TiO_2$/L of demineralized water) were dosed into the suspension. 15 minutes after completion of addition, the suspension was filtered off and the filtercake was washed. The filtercake was dried and calcined at 760° C. for 60 minutes. Extremely chromatic, high-gloss gold-colored effect pigments were obtained.

Comparative Example 1

200 g of synthetic mica platelets (fluorphlogopite platelets) having a particle size distribution according to MALVERN Mastersizer MS 2000: $D_{10}$=25 μm, $D_{50}$=55 μm, $D_{90}$=100 μm, span ΔD=1.36 were suspended in 1300 mL of demineralized water and heated to 85° C. with stirring. The pH of the suspension was lowered to pH 2.2. By addition of 100 g of a tin chloride solution of concentration c(Sn)=12 g/L, a layer of tin oxide was deposited on the surface of the synthetic mica platelets. Thereafter, the pH was lowered to pH 1.9 with dilute HCl, and then a solution of 500 mL of $TiCl_4$ (200 g of $TiO_2$/L of demineralized water) was added into the suspension. After the end of the addition, the mixture was stirred for a further 10 minutes and then the pH was adjusted to pH 2.6. Subsequently, 60 mL of an aqueous iron chloride solution having a density of 1.42 g/cm³ were added. 15 minutes after completion of addition, the suspension was filtered off and the filtercake was washed. The filtercake was dried and calcined at 870° C. for 60 minutes. Shiny gold pigments were obtained.

Comparative Example 2

Multilayer pigment based on natural mica platelets, Iriodin 307 Star Gold, from Merck.

Comparative Example 3 (Based on Example 1 of DE 1959998 A1)

100 g of natural mica platelets (muscovite platelets) having a particle size distribution according to MALVERN Mastersizer MS 2000: $D_{10}$=8 μm, $D_{50}$=20 μm, $D_{90}$=43 μm were suspended in 1010 mL of demineralized water and heated to 70° C. with stirring. The pH of the suspension was adjusted to pH 2.0 with a $TiCl_4$ solution in hydrochloric acid and then a solution of 250 mL of $TiCl_4$ (200 g of $TiO_2$/L of demineralized water) was dosed into the suspension. Thereafter, a mixture of 11.33 g of $FeCl_3.6H_2O$ dissolved in 6.7 mL of hydrochloric acid (density 1.19 g/cm$^3$), 66.7 mL of demineralized water and 240 mL of a 25% solution of $TiCl_4$ in hydrochloric acid was allowed to flow into the suspension at a rate of 60 mL/h with constant pH. After the end of the addition, at the same pH, a solution of 380 mL of $TiCl_4$ (200 g of $TiO_2$/L of demineralized water) was introduced into the suspension. After the addition had ended, the mixture was stirred for a further 2 to 4 hours. In the course of this, the pH of the suspension was raised gradually from 5 to 7 with sodium hydroxide solution. Subsequently, the suspension was filtered and the filtercake was washed. The resulting pigment was dried at 120° C. and then calcined at 950° C. for 60 min. A brown, highly agglomerated pigment with no gloss was obtained. No spacer layer is apparent in scanning electron micrographs of transverse sections.

Comparative Example 4 (Based on Claim 1 of CN 101289580 A)

100 g of natural mica platelets (muscovite platelets) having a particle size distribution according to MALVERN Mastersizer MS 2000: $D_{10}$=8 μm, $D_{50}$=20 μm, $D_{90}$=43 μm were suspended in 900 mL of demineralized water and heated to 85° C. with stirring. The pH of the suspension was adjusted to pH 2.25 with hydrochloric acid and then a solution of 3940 mL of $TiCl_4$ having a content of 102.5 g/L was added into the suspension. Thereafter, the pH of the suspension was adjusted to 4.0 and then a mixture of 1006 mL of $FeCl_3$ solution ($FeCl_3$ content 80 g/L) and 144 mL of $TiCl_4$ having a content of 102.5 g/L was allowed to flow in. After the addition had ended, the suspension was left to stand and the supernatant was decanted off, and suspension was concentrated to a solids content of 8.0%. Thereafter, the pH of the suspension was adjusted to 1.8, and 150 mL of a $SnCl_2$ solution having a tin content of 53.2 g/L were added gradually. A further layer was applied by adjusting the pH to 2.25 and then adding a solution of 2300 mL of $TiCl_4$ having a content of 102.5 g/L into the suspension. After the addition had ended, the mixture was stirred for a further 2 to 4 hours. In the course of this, the pH was kept constant. Subsequently, the suspension was filtered and the filtercake was washed. The moist pigment was dried at 150° C. and then calcined at 820° C. for 60 minutes. A gold pigment with moderate gloss and good hiding powder was obtained. No spacer layer is apparent in scanning electron micrographs of transverse sections.

Comparative Example 5 (Based on Example 2 of WO 2014/094993 A1)

100 g of natural mica platelets (muscovite platelets) having a particle size distribution according to MALVERN Mastersizer MS 2000: $D_{10}$=4.8 μm, $D_{50}$=21.3 μm, $D_{90}$=38.9 μm were suspended in 1500 mL of demineralized water and heated to 75° C. with turbulent stirring. The pH of the suspension was adjusted to pH 2.6 with hydrochloric acid and then a mixed solution of 158.6 mL of $FeCl_3$ solution (density 1.42 g/cm$^3$), 107.2 mL of $TiCl_4$ solution in hydrochloric acid with a $TiO_2$ content of 200 g/L, 11.8 g of $AlCl_3.6H_2O$ and 126.2 mL of demineralized water was added into the suspension. In the course of this, the pH was kept constant with sodium hydroxide solution. Thereafter, the pH of the suspension was adjusted to 1.8, and 805 mL of a $SnCl_2$ solution having a tin content of 0.91 g/L were added gradually within 300 minutes. Thereafter, the pH of the suspension was raised to 2.6 and 751.7 mL of a mixed solution of 285 mL of $FeCl_3$ solution (density 1.42 g/cm$^3$), 196.4 mL of $TiCl_4$ solution in hydrochloric acid with a $TiO_2$ content of 200 g/L, 11.8 g of $AlCl_3.6H_2O$ and 270.3 mL of demineralized water were gradually added into the suspension. In the course of this, the pH was kept constant. Subsequently, the pH was raised to 5.0, the mixture was stirred for a further 15 minutes and then the suspension was filtered. The pigment cake was washed, and the moist pigment was dried at 110° C. for 16 hours and then calcined at 850° C. for 30 minutes. A gold pigment with high hiding power was obtained. No spacer layer is apparent in scanning electron micrographs of transverse sections.

Comparative Example 6 (Based on Example 3 of WO 2014/094993 A1)

100 g of glass platelets having a particle size distribution according to MALVERN Mastersizer MS 2000: $D_{10}$=10 μm, $D_{50}$=20 μm, $D_{90}$=40 μm were suspended in 2000 mL of demineralized water and heated to 75° C. with turbulent stirring. The pH of the suspension was adjusted to pH 9.0 and then 95 mL of a sodium silicate solution (13.8% by weight of $SiO_2$) were added in at constant pH within 50 minutes. Thereafter, the pH of the suspension was adjusted to 2.6 and 250 mL of a mixed solution of 142.7 mL of $FeCl_3$ solution (density 1.42 g/cm$^3$), 101.3 mL of $TiCl_4$ solution in hydrochloric acid with a $TiO_2$ content of 200 g/L, 3.2 g of $AlCl_3.6H_2O$ and 6 mL of demineralized water were added into the suspension within 60 minutes. Then the pH of the suspension was adjusted to 1.8, and 492 mL of an $SnCl_2$ solution having a tin content of 24 g/L were added gradually within 4 hours. Thereafter, the pH of the suspension was raised to 2.6 and 250 g of a mixed solution of 142.7 g of $FeCl_3$ solution (density 1.42 g/cm$^3$), 101.3 mL of $TiCl_4$ solution in hydrochloric acid with a $TiO_2$ content of 200 g/L, 3.2 g of $AlCl_3.6H_2O$ and 6 mL of demineralized water were gradually added into the suspension within 350 minutes. In the course of this the pH was kept constant. Subsequently, the pH was raised to 5.0, the mixture was stirred for a further 15 minutes and then the suspension was filtered. The pigment cake was washed, and the moist pigment was dried at 110° C. for 16 hours and then calcined at 650° C. for 30 minutes. A gold pigment with good hiding power was obtained. No spacer layer is apparent in scanning electron micrographs of transverse sections.

II CHARACTERIZATION OF THE GOLD-COLORED EFFECT PIGMENTS OF THE INVENTION AND THE PIGMENTS OF THE COMPARATIVE EXAMPLES

IIa Particle Size Measurement

The size distribution curve of the gold-colored effect pigments of the invention and of the pigments from the comparative examples is determined using the Malvern Mastersizer 2000 instrument according to the manufacturer's instructions. For this purpose, about 0.1 g of the respective pigment was introduced into the sample preparation cell of the measuring instrument by means of a Pasteur pipette as an aqueous suspension, without addition of dispersing aids, with constant stirring, and analyzed repeatedly. The individual measurement results were used to form the medians. The scattered light signals were evaluated by the Fraunhofer method.

The median particle size $D_{50}$ in the context of this invention is understood to mean the $D_{50}$ of the cumulative frequency distribution of the volume-averaged size distribution function, as obtained by laser diffraction methods. The $D_{50}$ indicates that 50% of the pigments have a diameter equal to or less than the value reported, for example 20 μm. Correspondingly, the $D_{10}$ and $D_{90}$ respectively state that 10% and 90% of the pigments have a diameter equal to or less than the respective measured value.

The span $\Delta D$, defined as $$\Delta D = \frac{D_{90} - D_{10}}{D_{50}},$$

indicates the breadth of the particle size distribution. With regard to the visual appearance of the gold-colored effect pigments of the invention, a small value of $\Delta D$, i.e. a narrow span, is preferred.

TABLE 2

Particle sizes

| Example/comparative example | D10 [μm] | D50 [μm] | D90 [μm] | Span |
|---|---|---|---|---|
| Example 1 | 19.6 | 55.5 | 115.1 | 1.722 |
| Example 2 | 10.8 | 22.5 | 40.6 | 1.326 |
| Example 3 | 28.1 | 53.0 | 92.7 | 1.219 |
| Example 4 | 11.3 | 22.3 | 40.6 | 1.318 |
| Example 5 | 10.5 | 23.6 | 42.8 | 1.369 |
| Example 6 | 11.3 | 23.6 | 42.5 | 1.319 |
| Example 7 | 7.1 | 14.5 | 26.4 | 1.336 |
| Example 8 | 10.8 | 22.6 | 40.6 | 1.319 |
| Example 9 | 9.7 | 21.3 | 41.3 | 1.482 |
| Comparative example 1 | 12.1 | 22.8 | 40.6 | 1.247 |
| Comparative example 2 | 11.5 | 23.4 | 43.9 | 1.380 |
| Comparative example 3 | 12.6 | 24.1 | 43.0 | 1.262 |
| Comparative example 4 | 9.3 | 25.9 | 46.6 | 1.443 |
| Comparative example 5 | 8.5 | 24.0 | 44.0 | 1.480 |

IIb Angle-Dependent Color Measurements

To measure the color and brightness values, the effect pigments of the invention or the pigments from the comparative examples were stirred into a conventional nitrocellulose lacquer (Erco 2615e bronze mixing lacquer colorless; from Maeder Plastiklack AG) at a pigmentation level of 6% by weight, based on the total weight of the wet lacquer. This was done by initially charging the respective pigments and then dispersing them into the lacquer with a brush. The finished lacquer was applied to black/white hiding charts (Byko-Chart 2853, from Byk-Gardner) in a wet film thickness of 40 μm or of 76 μm (examples 1, 3 and 9) with a spiral applicator on an applicator drawdown apparatus (RK Print Coat Instr. Ltd. Citenco K 101 drawdown apparatus), and subsequently dried at room temperature. The choice of spiral applicator is made according to table A depending on the $D_{50}$ of the pigments or substrates to be applied in each case.

The BYK-mac multi-angle colorimeter (from Byk-Gardner) was used to determine the color values on the black background of the hiding chart at a constant angle of incidence of 45° (according to the manufacturer's instructions) at various observation angles relative to the specular angle. Characterization of the color intensity was accomplished using the chroma value $C^*_{15}$, and characterization of the hue using the hue angle $h^*_{15}$, each of which was measured at a measurement angle separated by 15° from the specular angle on the black background of the black/white hiding chart.

Strongly reflecting samples (mirrors in the ideal case) reflect virtually all the incident light at what is called the specular angle. The closer to the specular angle the measurement is made on the lacquer application, the more intense the appearance of the interference color.

TABLE A

Wet film thickness as a function of the $D_{50}$ of the pigments or substrates to be applied

| $D_{50}$ | Spiral applicator |
|---|---|
| <40 μm | 40 μm |
| 40 μm-85 μm | 76 μm |
| >85 μm | 100 μm |

TABLE 3

Color and brightness values at observation angle of 15° relative to the specular angle

| Example/comparative example | L 15° (s)[1] | a* 15° (s) | b* 15° (s) | C* 15° (s) | h* 15° (s) |
|---|---|---|---|---|---|
| Example 1 | 94.84 | −10.38 | 38.41 | 39.79 | 105.13 |
| Example 2 | 91.75 | −7.06 | 46.11 | 46.64 | 98.71 |
| Example 3 | 65.18 | −3.98 | 28.33 | 28.61 | 98.00 |
| Example 4 | 92.88 | −8.24 | 45.65 | 46.39 | 100.23 |
| Example 5 | 99.58 | −10.57 | 49.09 | 50.21 | 102.15 |
| Example 6 | 93.96 | −3.62 | 51.60 | 51.72 | 94.02 |
| Example 7 | 108.96 | −9.50 | 46.58 | 47.54 | 101.52 |
| Example 8 | 92.36 | −3.96 | 51.33 | 51.49 | 94.42 |
| Example 9 | 73.74 | −3.50 | 32.84 | 33.02 | 96.08 |
| Comparative example 1 | 86.43 | 1.08 | 33.97 | 33.99 | 88.18 |
| Comparative example 2 | 91.92 | −0.79 | 54.67 | 54.68 | 90.83 |
| Comparative example 3 | 64.23 | −4.76 | 7.39 | 8.79 | 122.79 |
| Comparative example 4 | 53.03 | 2.23 | 12.80 | 13.00 | 80.14 |
| Comparative example 5 | 66.24 | 6.53 | 19.90 | 20.94 | 71.84 |
| Comparative example 6 | 62.13 | 7.47 | 33.38 | 34.20 | 77.39 |

[1] measured on the black background of the black/white hiding chart.

The gold-colored effect pigments of the invention from examples 2, 4, 5, 6, 7 and 8 are much more intense in color than comparative examples 1 to 6.

An exception is comparative example 2. This is a multilayer pigment having the high refractive index/low refractive index/high refractive index structure, which assumes the highest color values because of its structure. The gold pigments 5, 6 and 8 of the invention are barely visually distinguishable from the multilayer pigment from comparative example 2, which is reflected in the virtually comparable $C^*_{15}$ values.

IIc Comparison of Hiding

To determine the hiding quotient $D_q$, defined as $$D_q = \frac{L^{*25}_{black}}{L^{*25}_{white}},$$

the brightness values L*25° of the lacquer applications from IIb were recorded with the BYK-mac multi-angle colorimeter (from Byk-Gardner) at a measurement angle of 25° on the black and white backgrounds of the black/white hiding chart. The 25° measurement geometry, at a constant angle of incidence of 45°, relates to the difference from the specular angle. The viewing angle is measured away from the specular reflection in the plane of illumination.

The effect pigments of the invention have good hiding power. The hiding quotient $D_q$ thereof is preferably ≥0.41. The hiding quotient $D_q$ of the inventive gold-colored effect pigments in platelet form from examples 1 to 10, as can be inferred from table 4, is in each case above 0.41.

IId Gloss Measurements

Gloss is a measure of directed reflection. To determine the gloss, the paint applications from IIb on the white background of the black/white hiding chart were analyzed at a measurement angle of 60° based on the vertical with the aid of a Micro-Tri-Gloss gloss meter from Byk-Gardner. The gloss values of the gold-colored effect pigments of the invention and of the pigments from the comparative examples are listed in table 4.

Some of the gold-colored effect pigments of the invention from examples 1 to 10 show distinctly higher gloss values than the pigments from comparative examples 1, 3, 4, 5 and 6. The gloss values of the pigments of the invention are in some cases even distinctly higher than the gloss value of a multilayer pigment having the high refractive index/low refractive index/high refractive index structure from comparative example 2.

IIe Effect Measurements

In order to objectively describe the optical effect of the gold-colored effect pigments of the invention, effect measurements were conducted with the BYK-mac spectrophotometer (from Byk-Gardner) using the lacquer applications from IIb (cf. Byk-Gardner catalog "Qualitätskontrolle für Lacke and Kunststoffe" [Quality Control for Lacquers and Adhesives], 2011/2012, p. 97/98). The corresponding measurement values for the sparkle intensity S_i, the sparkle area S_a and the graininess G are collected in table 4.

TABLE 4

Effect measurements, hiding quotient and gloss values

| Example/comparative example | S_i 15° (s)[1] | S_a 15° (s)[1] | G (s)[1] | $D_q$ 25° | 60° gloss (w)[2] |
|---|---|---|---|---|---|
| Example 1 | 26.52 | 34.28 | 13.33 | 0.6450 | 104.7 |
| Example 2 | 15.44 | 33.99 | 9.99 | 0.6068 | 85.8 |
| Example 3 | 62.36 | 27.51 | 16.09 | 0.4102 | 105.2 |
| Example 4 | 22.98 | 37.07 | 12.26 | 0.6059 | 74.2 |
| Example 5 | 13.14 | 32.77 | 10.38 | 0.6790 | 56.0 |
| Example 6 | 14.31 | 33.64 | 9.64 | 0.6490 | 90.9 |
| Example 7 | 8.98 | 28.07 | 6.78 | 0.7267 | 59.3 |
| Example 8 | 14.58 | 33.75 | 9.98 | 0.6297 | 91.6 |
| Example 9 | 51.65 | 34.71 | 13.17 | 0.4760 | 69.1 |
| Comparative example 1 | 8.97 | 27.68 | 7.18 | 0.5538 | 67.3 |
| Comparative example 2 | 13.79 | 35.47 | 9.93 | 0.6103 | 77.5 |
| Comparative example 3 | 5.90 | 28.28 | 6.12 | 0.4660 | 46.6 |
| Comparative example 4 | 5.09 | 26.10 | 5.46 | 0.4860 | 30.4 |
| Comparative example 5 | 11.29 | 34.03 | 7.17 | 0.5290 | 39.40 |
| Comparative example 6 | 11.48 | 37.13 | 7.74 | 0.4460 | 56.40 |

With the exception of example 7 (owing to the smaller particle size), all effect values (S_i, S_a and G) of the pigments of the invention are higher or comparable to the prior art. The effects achievable are much more marked than in the case of conventional gold-colored effect pigments having yellow absorption color as from comparative example 1. Even compared to multilayer pigments such as comparative example 2, the effects are at least equivalent, but usually distinctly higher.

IIf Waring Blender

In industry, many lacquers are processed in circulation systems. In this case, the lacquer components are subjected to high shear forces. The Waring blender test simulates these conditions and serves for determination of the ring line stability/shear stability. Specifically pigments wherein the coating has not been adequately anchored on the support material exhibit significant deviations in the brightness values in this test relative to the untreated applications. The Waring blender test can thus be regarded as a measure of the mutual adhesion of the individual coatings with respect to shear forces.

Procedure:

The pigment paste was weighed out and converted to a paste in a stepwise manner with a conventional wet lacquer based on hydroxy-functional acrylates in an 880 mL beaker. Thereafter, the viscosity was adjusted with butyl acetate/xylene 1:1 to 17" in the DIN 4 mm cup. A total of 600 g of lacquer were produced, of which 400 g were introduced into a jacketed water-cooled 1 kg vessel and stirred with a specific attachment under the Dispermat (from Waring Blenders). The stirring time was 8 minutes at 13 500 rpm, then 200 g of lacquer were removed and the rest was stirred for a further 12 minutes.

Recipe:

6% powder (pigment)

8% butyl acetate 85

86% acrylic lacquer, colorless

30% dilution butyl acetate 85/xylene 1:1

200 g each of the untreated and treated lacquers were then applied with a spraying machine and the Sata LP-90 spray gun according to the following settings:

Setting:

Needle: 1.3.4

Pressure: 4 bar

Runs:

The number of spray runs was chosen such that there was a dry lacquer layer thickness of 15-20 μm.

Conventionally, effect pigments are regarded as being shear-stable when the gloss differential and the color differential, measured by the chroma $C^*_{15}$ close to the specular angle, is relatively low in the application after the Waring blender test.

The $\Delta C^*_{15}$ relative to the untreated sample should ideally be less than 2.

Table 5 shows the change in color $\Delta C^*_{15}$ of the sample that has been subjected to the Waring blender test relative to the untreated sample for inventive example 6.

TABLE 5

|  | ΔC*(15°) | Δgloss (60°) |
|---|---|---|
| Example 6 | 1.1 | −1.0 |

The test sheet of inventive example 6 satisfies the criteria of the test. The color difference is negligibly small. Even under the microscope, it is barely possible to detect any changes such as flaking of the coating or other surface defects that have arisen.

The gold pigments of the invention are found to be extremely shear-stable in spite of their spacer layer.

IIg Determination of Chemical Stability

The chemical stability of the gold-colored effect pigments of the invention and of the pigments from the comparative examples was determined with reference to applications of lacquer to plastic panels. 6 g of the respective pigment were stirred into a mixture of 90 g of a conventional colorless acrylic lacquer and 10 g of butyl acetate 85. Thereafter, the viscosity was adjusted with a mixture of butyl acetate 85 and xylene in a ratio of 1:1 to 17" in the DIN 4 mm cup.

100 g of this lacquer in each case were applied to the panels in hiding application analogously to IIf with a spraying machine. After the coating, the panels were dried at 80° C. for 30 minutes.

24 hours later, the panels were immersed to half their height into 10% sodium hydroxide solution. After a contact time of 7 days, the panels were rinsed with demineralized water and then, after drying time of 2 hours, assessed visually for damage and/or discoloration. In addition, discoloration was analyzed with the aid of the BYK-mac (from Byk-Gardner). The change in color was characterized using the $\Delta E$ value of the exposed sample versus the corresponding unexposed sample at a measurement angle of 15°. The results are shown in table 6 below.

TABLE 6

|  | $\Delta E(15°)$ |
| --- | --- |
| Example 6 | 2.7 |
| Comparative example 2 | 44.0 |

Pigments with a $\Delta E(15°)<3$ can be regarded as stable to chemicals. The gold-colored effect pigments of the invention from example 6 are well below the limit, while the pigments from comparative example 2 distinctly exceed it.

IIh X-Ray Fluorescence Analysis (XRF)

The metal oxide, metal hydroxide and/or metal oxide hydrate contents of the gold-colored effect pigments of the invention and of the pigments from the comparative examples were determined by means of x-ray fluorescence analysis (XRF). For this purpose, the respective pigments were incorporated into a lithium tetraborate glass tablet, fixed in solid sample measuring cups and analyzed therefrom. The measuring instrument used is the Advantix ARL system from Thermo Scientific. The measurements are shown in table 7. The figures for the different contents are reported here as $TiO_2$ for titanium, as $Fe_2O_3$ for iron, and as $SnO_2$ for tin.

TABLE 7

Mean height $h_a$ of the spacer layer and XRF values

| Example/ comparative example | Mean height $h_a$ [nm] from SEM | XRF (as metal oxide) | | |
| --- | --- | --- | --- | --- |
| | | Ti[%] | Fe[%] | Sn[%] |
| Example 1 | 26 | 43.7 | 3.3 | 1.3 |
| Example 2 | 30 | 57.7 | 6.9 | 0.78 |
| Example 3 | 12 | 28.6 | 3.1 | 0.98 |
| Example 4 | 34[1] and 38[2] | 66.3 | 7.8 | 1.2 |
| Example 5 | 24 | / | / | / |
| Example 6 | 37 | 49.9 | 6.9 | 0.47 |
| Example 7 | 39 | / | / | / |
| Example 8 | 50 | / | / | / |
| Example 9 | 20 | 23.9 | 4.6 | 1.26 |
| Comparative example 1 | no spacer layer | 40.4 | 4.4 | 0.46 |
| Comparative example 2 | no spacer layer | 27.1 | 18.8 | 0.39 |
| Comparative example 3 | no spacer layer | 50.9 | 1.6 | <0.05 |
| Comparative example 4 | no spacer layer | 66.1 | 8.9 | 2.6 |
| Comparative example 5 | no spacer layer | 50.7 | 11.8 | 3.4 |
| Comparative example 6 | no spacer layer | 24.2 | 39.5 | 0.28 |

[1]= $h_a$ for spacer layer close to substrate
[2]= $h_a$ for spacer layer remote from substrate IIi Condensate Water Test To determine condensate water stability, the gold-colored effect pigments of the invention and the pigments from the comparative examples were incorporated into a waterborne lacquer system and the test applications were produced by spray painting onto aluminum sheets. The basecoat was overcoated with a conventional one-component clearcoat and then baked. These applications were tested according to DIN 50 017 (water condensation—constant atmospheres). Bond strength was tested by means of cross-cutting according to DIN EN ISO 2409 immediately after the end of the test by comparison with the unexposed sample. In this context, Cc 0 means no change and Cc 5 a very significant change.

The swelling characteristics were visually assessed immediately after condensate water exposure in accordance with DIN 53230. In this context, the index 0 means no change and the index 5 a very significant change.

Finally, the DOI (distinctness of image) was determined with the aid of a Wave-scan II from Byk-Gardner.

TABLE 8

Condensate water results

| Example/ comparative example | 20° gloss before CW test | 20° gloss after CW test | Loss of gloss | DOI | Cross-cutting immediate | Swelling visual |
| --- | --- | --- | --- | --- | --- | --- |
| Example 8 | 98 | 94 | 4% | 74.4 | 1 | 0 |
| Comparative example 1 | 97 | 28 | 71% | n.d. | 5 | 5 |

The pigment from comparative example 1 had significant swelling characteristics and poor interlayer adhesion. The gold-colored effect pigment of the invention from example 8, by contrast, was found to be very stable and had virtually no changes before and after the test.

IIj UV Stability

The UV stability of the gold-colored effect pigments of the invention and of the pigments from the comparative examples was determined in accordance with the quick UV test described in EP 0 870 730 A1 for determination of the photochemical UV activity of $TiO_2$ pigments. For this purpose, 1.0 g of the corresponding pigment were dispersed into 9.0 g of a double bond-rich melamine-containing lacquer. Applicator drawdowns on white cardboard were produced and dried at room temperature. The applicator drawdowns were divided and one of the two sections of each was stored in the dark as an unexposed comparative specimen. Subsequently, the samples were irradiated with UV-containing light (UVA-340 lamp, irradiation intensity 1.0 W/m²/nm) in a QUV system from Q-Panel for 150 minutes. Immediately after the end of the test, a Minolta CM-508i colorimeter was used to determine color values for the exposed samples relative to the respective reference sample. The resulting $\Delta E^*$ values, calculated according to the Hunter L*a*b* formula, are shown in table 9.

In this test, essentially a gray/blue color of the $TiO_2$ layer of the respective pigment is observed owing to Ti(III) species formed under UV light. A condition for this is that the electron hole has left the environment of the $TiO_2$ and cannot recombine directly with the remaining electron again—for instance through reaction with olefinic double bonds of the binder. Since a melamine-containing lacquer layer significantly slows the diffusion of water (vapor) and oxygen to the pigment surface, reoxidation of the titanium (III) species takes place at a significantly retarded rate, and so the graying can be measured and the $\Delta E^*$ value can be used as a measure for the UV stability of the pigments. A relatively large numerical $\Delta E^*$ value of the exposed sample relative to the unexposed reference sample thus means relatively low UV stability of the pigment examined.

TABLE 9

UV test results

| Example/comparative example | $\Delta E^*$ |
|---|---|
| Example 8 | 3.2 |
| Comparative example 1 | 7.3 |

The pigment from comparative example 1 had more than twice as high a change in color ($\Delta E^*$) after corresponding exposure than inventive example 8.

IIk Determination of the Mean Thickness of the Nonmetallic Substrates in Platelet Form, the Mean Layer Thickness of Layers 2 and 3, the Mean Layer Thickness of the Overall Coating, the Mean Height $h_a$ of the Spacer Layer and the Mean Height $h_H$ of the Cavities For this purpose, the gold-colored effect pigments of the invention were incorporated in a concentration of 10% into a two-component clearcoat, Autoclear Plus HS from Sikkens GmbH, with a sleeved brush, applied to a film with the aid of a spiral applicator (wet film thickness 26 µm) and dried. After a drying time of 24 h, transverse sections of these applicator drawdowns were produced. The transverse sections were analyzed by SEM, with analysis of at least 100 individual pigments to be statistically meaningful for determination of the mean thickness of the nonmetallic substrates in platelet form.

To determine the mean layer thickness of layers 2 and 3, the mean thickness of the overall coating, the mean height $h_a$ of the spacer layer and the mean height $h_H$ of the cavities, the upper and lower substrate surfaces, i.e. the longer side of the nonmetallic substrate in platelet form recognizable in each case in the SEM transverse section, were each used as the baseline. The baseline was drawn here along the surface of the substrate in platelet form in the scanning electron micrograph of the transverse section by connecting the two points of intersection of nonmetallic substrate in platelet form—optional layer 1 or of nonmetallic substrate in platelet form—layer 2 from the left- and right-hand edges of the scanning electron micrograph of the transverse section to one another by means of a straight line. The scanning electron micrographs of transverse images were analyzed with the aid of the AxioVision 4.6.3 image processing software (from Zeiss).

A sufficient number of parallel lines were drawn at 50 nm intervals at a 90° angle from these two baselines as to place a grid over the complete scanning electron micrograph of the transverse section of the effect pigment (FIG. 4). The magnification of the scanning electron micrograph of the transverse section was preferably at least 50 000-fold, based on Polaroid 545. Proceeding from the respective upper and lower baselines of the nonmetallic substrate in platelet form in the direction of layer 3 in each case, the distances between the points of intersection of these lines at the respective interfaces of the optional layer 1 with layer 2, of layer 2 with the spacer layer, of spacer layer with layer 3 and of layer 3 with the environment were measured manually. There was an instance here of one of the lines drawn at 50 nm intervals occurring directly above a connection or a spacer. In this case, only the respective point of intersection at the interface of line 3 with the environment was recorded. These measurements gave rise to the layer thicknesses of layers 2 and 3, the thickness of the overall coating, and the height $h_a$ of the spacer layer by formation of differences.

For the determination of the mean height $h_H$ of the cavities, the points of intersection of these parallel lines with the upper and lower cavity boundaries within the spacer layer were used.

The individual values of the layer thicknesses, the height $h_a$ and the height $h_H$ that have been determined in this way were used to form the respective arithmetic means in order to determine the above-specified values for the mean layer thicknesses, the mean height $h_H$ and the mean height $h_a$. To be statistically meaningful, the above-described measurements were conducted on at least 100 lines.

The term "mean" in all cases means the arithmetic mean.

Transverse sections of the pigments from the comparative examples that do not have a spacer layer but may have statistically distributed pores within the coating were likewise examined by the method described above using scanning electron micrographs of transverse sections. In this case, if one of the parallel lines occurred above one or more pores, the height of the pore(s), the pore midpoint(s) thereof and the distance of the pore midpoint(s) from the substrate surface were determined.

As an alternative to transverse sections, the inventive gold-colored effect pigments can also be cut by means of the FIB method (FIB=focused ion beam). For this purpose, a fine beam of highly accelerated ions (for example gallium, xenon, neon or helium) is focused to a point by means of ion optics and guided line by line over the effect pigment surface to be processed. On impact with the effect pigment surface, the ions release most of their energy and destroy the coating at this point, which leads to removal of material line by line. It is also possible using the scanning electron micrographs that have then been recorded, by the method described above, to determine the mean height $h_a$, the mean layer thickness of layers 2 and 3 and the mean layer thickness of the overall coating. The mean thickness of the nonmetallic substrate in platelet form can also be determined using scanning electron micrographs of the effect pigments that have been cut by the FIB method.

TABLE 10

| Example/comparative example | $d_{S2}$ [nm] | $d_{S3}$ [nm] | $d_{S2}/d_{S3}$ | $h_{ma}$ [nm] | $h_{Rma}$ | $\sigma h_{Rma}$ [%] | $n_S$ | $S_D$ [%] | $A_H$ [%] |
|---|---|---|---|---|---|---|---|---|---|
| Example 2 | 85 | 91 | 0.94 | 100 | 0.49 | 4.0 | 1.1 | 5.4 | 94.6 |
| Example 5 | 85 | 109 | 0.78 | 97 | 0.52 | 5.1 | 3.4 | 17.2 | 82.8 |
| Example 6 | 123 | 113 | 1.09 | 142 | 0.52 | 4.6 | 1.5 | 7.6 | 92.4 |
| Example 9 | 100 | 118 | 0.85 | 110 | 0.46 | 4.9 | 2.2 | 11.1 | 88.9 |
| Comparative example 1 | no spacer layer | | | | 0.54 | 21.3 | 18 | 90 | 10 |
| Comparative example 2 | no spacer layer | | | | 0.54 | 20.6 | 6.9 | 34.4 | 65.6 |

$d_{S2}$ [nm] = mean layer thickness of layer 2
$d_{S3}$ [nm] = mean layer thickness of layer 3
$n_S$ = mean number of bars per μm
$A_H$ [%] = area proportion of cavities
$S_D$ = network density [%]
$h_{ma}$ = midpoint of the spacer layer (sum total of the layer thickness of the optional layer 1 and of layer 2 and half the height $h_a$)
$h_{Rma}$ = relative height of the spacer layer
$\sigma h_{Rma}$ [%] = standard deviation of the relative height of the spacer layer Table 7 shows the mean height $h_a$ of the spacer layer of the pigments examined. All the gold-colored effect pigments of the invention, by contrast with the pigments from the comparative examples, have a spacer layer.

The pigments from comparative examples 1 and 2 do not have a spacer layer, but have a statistical distribution of pores within the coating. In table 10, for comparative examples 1 and 2, the value in the $\sigma h_{Rma}$ [%] column means the standard deviation of the pore midpoints from the substrate surface. The pigment from comparative example 2 contains pores in statistical distribution and the network density $S_D$ is 34.4%. The standard deviation of the pore midpoints from the substrate surface is 20.6%, which demonstrates that the pores are statistically distributed within the overall coating. The situation is different for the gold-colored effect pigments of the invention from examples 2, 5, 6 and 9. Here, the standard deviation of the relative height of the midpoint of the spacer layer $h_{Rma}$ is <6% in each case, which indicates that the respective spacer layer thereof is at a defined position within the coating. The standard deviation of the distances of the pore midpoints from the substrate surface of the pigment from comparative examples 1 and 2 can thus be compared with the standard deviation of the relative height of the midpoint of the spacer layer of the gold-colored effect pigments of the invention.

In table 10, the network density of the gold-colored effect pigments of the invention is much lower than in the case of the pigment from comparative example 1 with a value of 90%. There is no spacer layer here because of the extremely small number of pores.

III Scanning Electron Micrographs

The scanning electron micrographs were obtained using transverse sections of the gold-colored effect pigments of the invention with the Supra 35 scanning electron microscope (from Zeiss) (for example FIGS. 1-4). Energy-dispersive x-ray micro-analysis (EDX analysis) was conducted with the EDAX Sapphire instrument, from EDAX.

III APPLICATION EXAMPLES

Application Example 1: Body Lotion

| INCI name | Product name | % by wt. | Manufacturer/supplier |
|---|---|---|---|
| Phase A | | | |
| | Effect pigment from example 1 | 85.80 0.20 | |

-continued

| INCI name | Product name | % by wt. | Manufacturer/supplier |
|---|---|---|---|
| Aqua | Water | | |
| Glycerin | Glycerin 85% | 2.00 | H. Erhard Wagner |
| Xanthan Gum | Keltrol CG-T | 0.60 | CP Kelco |
| Phase B | | | |
| Isopropyl Palmitate | Isopropyl palmitate | 3.00 | H. Erhard Wagner |
| Glyceryl Stearate | Aldo MS K FG | 2.00 | Lonza |
| *Cocos Nuifera* Oil | Ewanol KR | 2.00 | H. Erhard Wagner |
| Cetearyl Alcohol | Tego Alkanol 1618 | 2.00 | Evonik |
| Dimethicone | Element 14 PDMS | 1.00 | Momentive |
| Sodium Polyacrylate | Cosmedia SP | 0.50 | BASF |
| Phase C | | | |
| Phenoxyethanol, Ethylhexylglycerin | Euxyl PE 9010 | 0.80 | Schülke & Meyr |
| Fragrance | Vitamin Bomb | 0.10 | Bell Europe |

The effect pigment from example 1 can be used within a range from 0.1% to 2.5% by weight, based on the total weight of the body lotion formulation. Compensation to 100% by weight of the formulation can be effected with water.

Keltrol CG-T was dispersed in phase A and heated to 75° C. Phase B was heated separately to 75° C. Subsequently, phase B was added gradually to phase A. The emulsion was cooled down to room temperature while stirring and phase C was added individually.

Application Example 2: Eyeshadow Cream

| INCI name | Product name | % by wt. | Manufacturer/supplier |
|---|---|---|---|
| Phase A | | | |
| Microcrystalline Wax | TeCero-Wax 1030 K | 4.50 | Tromm Wachs |
| *Copernicia Cerifera Cera* | LT 124 carnauba wax | 4.50 | Tromm Wachs |
| Isohexadecane | Isohexadecane | 21.00 | Ineos |
| Cyclopentasiloxane, Dimethicone/Vinyltrimethyl-siloxysilicate Crosspolymer | Belsil RG 100 Silicone Elastomer Resin Gel | 8.00 | Wacker |

-continued

| INCI name | Product name | % by wt. | Manufacturer/supplier |
|---|---|---|---|
| Trimethylsiloxyphenyl Dimethicone | Belsil PDM 20 | 6.00 | Wacker |
| Dimethicone | Belsil DM 100 | 14.00 | Wacker |
| Caprylic/Capric Triglyceride | Miglyol 812 | 7.00 | Sasol |
| Cyclomethicone (and) Quaternium-90 Bentonite (and) Propylene Carbonate | Tixogel VSP-1438 | 5.00 | BYK |
| Phase B | | | |
| | Effect pigment from example 3 | 30.00 | |

The effect pigment from example 3 can be used within a range from 5% to 30.0% by weight, based on the total weight of the eyeshadow formulation. Compensation to 100% by weight of the formulation can be effected with isohexadecane.

Phase A was mixed and heated to 85° C., then phase B was added to phase A while stirring. After dispensing into an appropriate container, the mixture is cooled to room temperature.

Application Example 3: Shower Gel

| INCI name | Product name | % by wt. | Manufacturer/supplier |
|---|---|---|---|
| Phase A | | | |
| | Effect pigment from example 5 | 0.10 | |
| Aqua | Wasser | 58.50 | |
| Acrylates Copolymer | Carbopol Aqua SF-1 | 5.50 | Lubrizol |
| Phase B | | | |
| Sodium Hydroxide | NaOH (10% by wt.) | 1.50 | |
| Phase C | | | |
| Sodium Laureth Sulfate | Zetesol NL-2 U | 22.00 | Zschimmer & Schwarz |
| Cocamidopropyl Betaine | Amphotensid B5 | 6.00 | Zschimmer & Schwarz |
| PEG-7 Glyceryl Cocoate | Emanon HE | 2.00 | Kao Corp. |
| Disodium Laureth Sulfosuccinate | Sectacin 103 Spezial | 2.00 | Zschimmmer & Schwarz |
| Phase D | | | |
| Phenoxyethanol (and) Piroctone Olamine | Nipaguard PO 5 | 0.60 | Clariant |
| Fragrance | Water Lily OA | 0.20 | Bell Flavors and Fragrances |
| Sodium Chloride | Sodium Chloride | 1.60 | VWR |

The effect pigment from example 5 can be used within a range from 0.01% to 1.0% by weight, based on the total weight of the shower gel formulation. Compensation to 100% by weight of the formulation can be effected with water.

Phase A was stirred, then phase B was added and stirred until a homogeneous appearance was achieved. Phase C was weighed out separately, mixed briefly and added to phase AB. Subsequently, the mixture was stirred again and phase D was added individually.

Application Example 4: Eyeshadow Compact

| INCI name | Product name | % by wt. | Manufacturer/supplier |
|---|---|---|---|
| Phase A | | | |
| Talc | Talc Powder | 36.00 | VWR |
| Bentonite | Optigel CK-PC | 5.00 | BYK |
| Synthetic Fluorphlogopite | Synafil S 1050 | 13.00 | ECKART |
| Aluminum Starch Octenylsuccinate | Agenaflo OS 9051 | 10.00 | Agrana |
| Magnesium Stearate | Magnesium Stearate | 6.00 | VWR |
| | Effect pigment from example 7 | 20.00 | |
| Phase B | | | |
| Cyclomethicone | Xiameter PMX-0345 | 5.00 | Dow Corning |
| Octyldodecyl Stearoyl Stearate | Ceraphyl 847 | 5.00 | Ashland |

The effect pigment from example 7 can be used within a range from 5.0% to 40.0% by weight, based on the total weight of the eyeshadow formulation. Compensation to 100% by weight of the formulation can be effected with talc.

Phase A was mixed in a high-speed mixer at 2500 rpm for 30 s. Subsequently, phase B was added and the mixture was stirred in the same mixer at 3000 rpm for 60 s. Finally, the powder mixture was pressed into shape by means of an eyeshadow press at 100 bar for 30 seconds.

Application Example 5: Mascara

| INCI name | Product name | % by wt. | Manufacturer/supplier |
|---|---|---|---|
| Phase A | | | |
| Aqua | Water | 73.00 | |
| Bentonite (and) Xanthan Gum | Optigel WX-PC | 2.00 | BYK |
| Phase B | | | |
| Cetyl Alcohol (and) Glyceryl Stearate (and) PEG-75 Stearate (and) Ceteth-20 (and) Steareth-20 | Emulium Delta | 5.00 | Gattefosse |
| C10-18 Triglycerides | Lipocire A Pellets | 2.00 | Gattefosse |
| Ozokerite | Kahlwax 1899 | 2.00 | Kahl |
| Glyceryl Behenate | Compritol 888 CG Pastilles | 2.00 | Gattefosse |
| Butylene Glycol Cocoate | Cocoate BG | 4.00 | Gattefosse |
| Phase C | | | |
| | Effect pigment from example 2 | 5.00 | |
| Phenoxyethanol (and) Piroctone Olamine | Nipaguard PO5 | 0.50 | Clariant |
| *Glycine Soja* (Soybean) Oil, Dicaprylyl Ether, *Magnolia Grandiflora* Bark Extract, Lauryl Alcohol | Follicusan DP | 3.00 | CLR Berlin |
| Water, Hydrolyzed Corn Starch, *Beta Vulgaris* (Beet) Root Extract | DayMoist CLR | 1.00 | CLR Berlin |
| Linoleic Acid (and) Linolenic Acid | Vitamin F forte | 0.50 | CLR Berlin |

The effect pigment from example 2 can be used within a range from 1.0% to 10.0% by weight, based on the total weight of the mascara formulation. Compensation to 100% by weight of the formulation can be effected with the water from phase A.

Phase A was stirred under high shear. Phase B was weighed out separately. Phase A and phase B were heated separately to 85° C., then phase B was added to phase A. Subsequently, phase AB was cooled to 45° C. and, during the cooling, phase C was added gradually while stirring.

Application Example 6: Hair Gel

| INCI name | Product name | % by wt. | Manufacturer/supplier |
|---|---|---|---|
| Phase A | | | |
| Sodium Magnesium Silicate (nano) | Laponite XLG | 2.00 | BYK |
| Aqua | Water | 94.80 | |
| Phase B | | | |
| | Effect pigment from example 6 | 0.10 | |
| Citric Acid (and) Water | Citric Acid (10%) | 0.30 | |
| Glycerin, Water, *Avena Strigosa* Seed Extract, Lecithin, Potassium Sorbate, Citric Acid | Aquarich | 1.50 | Rahn AG |
| Fragrance | Lychee & Grape | 0.10 | Bell Europe |
| Methylisothiazolinone (and) Phenethyl Alcohol (and) PPG-2-Methyl Ether | Optiphen MIT Plus | 1.20 | Ashland |

The effect pigment from example 6 can be used within a range from 0.01% to 2.0% by weight, based on the total weight of the hair gel formulation. Compensation to 100% by weight of the formulation can be effected with water.

The Laponite XLG was stirred with water until phase A became clear. Then the effect pigment from example 6 was added to phase B while stirring. Subsequently, the rest of the ingredients of phase B were added gradually.

Application Example 7: Body Powder

| INCI name Phase A | Product name | % by wt. | Manufacturer/supplier |
|---|---|---|---|
| Synthetic Fluorphlogopite | Synafil S 1050 | 40.00 | Eckart |
| Polypropylene | Synafil W 1234 | 8.00 | Eckart |
| Bentonite | Optigel CK-PC | 10.00 | BYK |
| Talc | Talc Powder | 18.00 | VWR |
| Magnesium Stearate | Magnesium Stearate | 4.00 | Applichem |
| | Effect pigment from example 7 | 20.00 | |

The effect pigment from example 7 can be used within a range from 0.2% to 5.0% by weight, based on the total weight of the body powder formulation. Compensation to 100% by weight of the formulation can be effected with Synafil S 1050.

Phase A was mixed and then the powder was dispensed into a suitable vessel.

Application Example 8: Lipgloss

| INCI name | Product name | % by wt. | Manufacturer/supplier |
|---|---|---|---|
| Phase A | | | |
| Hydrogenated Polyisobutene (and) Ethylene/Propylene/Styrene Copolymer (and) Butylene/Ethylene/Styrene Copolymer | Versagel ME 750 | 75.30 | Penreco |
| *Simmondsia Chinensis* (Jojoba) Seed Oil | Jojoba Oil - Natural | 2.00 | BioChemica |
| Caprylyl Trimethicone | Silcare Silicone 31M50 | 7.00 | Clariant |
| Stearyl Dimethicone | Silcare Silicone 41M65 | 3.20 | Clariant |
| Hydrogenated Polydecene | Dekanex 2004 FG | 4.00 | IMCD |
| Isopropyl Myristate | Isopropyl Myristate | 4.50 | VWR |
| Phase B | | | |
| | Effect pigment from example 4 | 4.00 | |

The effect pigment from example 4 can be used within a range from 0.10% to 8.00% by weight, based on the total weight of the lipgloss formulation. Compensation to 100% by weight of the formulation can be effected with Versagel ME 750.

Phase A was heated to 85° C., then the pigment from example 6 was added to phase B and stirred until the consistency was homogeneous, and then dispensed into a lipgloss vessel.

Application Example 9: Lipstick

| INCI name | Product name | % by wt. | Manufacturer/supplier |
|---|---|---|---|
| Phase A | | | |
| Octyldodecanol | Eutanol G | 42.5 | BASF |
| *Candelilla Cera* | Kahlwax 2039 | 6.00 | Kahl |
| *Copernicia Cerifera* (Carnauba) Wax | Kahlwax 2442 | 6.00 | Kahl |
| Bis-Diglyceryl Polyacyladipate-2 | Softisan 649 | 10.00 | Sasol |
| Polyisobutene | Rewopal PIB 1000 | 10.00 | Evonik |
| Hydrogenated Polydecene | Silkflo 364 NF Polydecene | 5.00 | Ineos |
| C10-18 Triglycerides | Lipocire A Pellets | 5.00 | Gattefosse |
| *Acacia Decurrens*/Jojoba/Sunflower Seed Wax/Polyglyceryl-3 Esters | Hydracire S | 5.00 | Gattefosse |
| Tocopheryl Acetate | dl-alpha-Tocopheryl Acetate | 0.50 | IMCD |
| Phase B | | | |
| | Effect pigment from example 9 | 10.00 | |

The effect pigment from example 9 can be used within a range from 0.5% to 20.0% by weight, based on the total weight of the lipstick formulation. Compensation to 100% by weight of the formulation can be effected with Eutanol G.

Phase A was heated to 85° C., then phase B was added to phase A and mixed. Subsequently, this mixture was dispensed into a lipstick mold at a temperature of 75° C.

Application Example 10: Liquid Eyelid Liner

| INCI name | Product name | % by wt. | Manufacturer/supplier |
|---|---|---|---|
| Phase A | | | |
| Aqua | Water | 56.90 | |
| Bentonite (and) Xanthan Gum | Optigel WX-PC | 1.40 | |
| Phase B | | | |
| Lecithin | Emulmetik 100 | 0.10 | Lucas Meyer |
| Copernicia Cerifera Cera | Kahlwax 2442 | 1.00 | Kahl |
| Stearic Acid | Stearic Acid | 3.50 | Lipo Chemicals |
| Hydrogenated Polyisobutene | Panalane L14 E | 5.00 | Ineos |
| Polysorbate 60 | Mulsifan CPS 60 | 1.50 | Zschimmer & Schwarz |
| Phase C | | | |
| | Effect pigment from example 1 | 4.00 | |
| Polyurethane-35 | Baycusan C 1004 | 18.00 | Bayer Cosmetics |
| Aqua and CI 77499 and Methylpropanediol and Ammonium Acrylates Copolymer and Simethicone and Caprylyl Glycol and Phenylpropanol Sodium Acrylates Copolymer | WorléeBase AQ 77499/1 | 8.00 | Worlée |
| Phenoxyethanol, Ethylhexylglycerin | Euxyl PE 9010 | 0.60 | Schülke & Mayr |

The effect pigment from example 1 can be used within a range from 0.5% to 8.0% by weight, based on the total weight of the eyelid liner formulation. Compensation to 100% by weight of the formulation can be effected with water.

Optigel WX-PC was dispersed in water of phase A and stirred for 10 minutes. Phase A and phase B were heated separately to 80° C. Thereafter, phase B was added gradually to phase A while stirring. After cooling to 45° C., the ingredients of phase C were added gradually and the mixture was dispensed into a suitable package.

Application Example 11: Mousse

| INCI name | Product name | % by wt. | Manufacturer/supplier |
|---|---|---|---|
| Phase A | | | |
| Cyclopentasiloxane | Xiameter PMX-0245 Cyclosiloxane | 8.60 | Dow Corning |
| Hydrogenated Polyisobutene | MC 30 | 4.00 | Sophim |
| Dimethicone (and) Dimethicone Crosspolymer | Dow Corning 9041 Silicone Elastomer Blend | 37.14 | Dow Corning |

-continued

| INCI name | Product name | % by wt. | Manufacturer/supplier |
|---|---|---|---|
| Squalane | Squalane | 5.74 | Impag |
| Isononyl Isononanoate | Dermol 99 | 10.16 | Akzo International |
| Hydrogenated Jojoba Oil | Jojoba Butter LM | 2.15 | Desert Whale |
| Hydrogenated Jojaba Oi | Jojoba Butter HM | 1.00 | Desert Whale |
| C30-45 Alkyl Methicone (and) C30-45 Olefin | Dow Corning AMS-C30 Cosmetic Wax | 1.15 | Dow Corning |
| Stearyl Dimethicone | Dow Corning 2503 Cosmetic Wax | 0.47 | Dow Corning |
| Cyclopentasiloxane (and) Polypropylsilsesquioxane | Dow Corning 670 Fluid | 5.00 | Dow Corning |
| Phase B | | | |
| Dimethicone/Vinyl Dimethicone Crosspolymer | Dow Corning 9506 Powder | 16.02 | Dow Corning |
| Silica Dimethyl Silylate | Covasilic 15 | 0.17 | LCW |
| Talc | Talc Powder | 5.00 | Sigma-Aldrich |
| | Effect pigment from example 2 | 3.00 | |
| Phase D | | | |
| Phenoxyethanol, Ethylhexylglycerin | Euxyl PE 9010 | 0.40 | Schülke & Mayr |

The effect pigment from example 2 can be used within a range from 0.1% to 8.0% by weight, based on the total weight of the mousse formulation. Compensation to 100% by weight of the formulation can be effected with Dow Corning 9041 Elastomer.

Phase A was mixed and heated until everything had melted. Phase B was weighed out separately and mixed with a high-speed mixer at 2400 rpm for 60 s. Half of the molten phase A was added to phase B and the mixture was mixed again in the mixer at 2400 rpm for 30 s. Subsequently, the remaining portion of phase B was likewise added to phase A and the mixture was mixed again in the mixer at 2400 rpm for 30 s. Lastly, phase C was added to phase AB and the mixture was mixed again in the high-speed mixer at 2400 rpm for 30 s.

Application Example 12: Nail Varnish

| INCI name | Product name | % by wt. | Manufacturer/supplier |
|---|---|---|---|
| Phase A | | | |
| | Effect pigment from example 9 | 4.00 | |
| Phase B | | | |
| Butylacetate (and) Ethylacetate (and) Nitrocellulose (and) Isopropyl Alcohol | International Lacquers Nailpolish Base 15244 | 96.00 | International Lacquers |

The effect pigment from example 9 can be used within a range from 0.1% to 8.0% by weight, based on the total weight of the nail varnish formulation. Compensation to 100% by weight of the formulation can be effected with International Lacquers Nailpolish.

Phase A and phase B were mixed and then dispensed into an appropriate container.

Application Example 13: Nail Varnish with Soft-Touch Effect

| INCI name | Product name | % by wt. | Manufacturer/ supplier |
|---|---|---|---|
| Phase A | | | |
| | Effect pigment from example 9 | 4.00 | |
| Polypropylene | Synafil W 1234 | 5.00 | Eckart |
| Phase B | | | |
| Butylacetate (and) Ethylacetate (and) Nitrocellulose (and) Isopropyl Alcohol | International Lacquers Nailpolish Base 15244 | 91.00 | International Lacquers |

The effect pigment from example 9 can be used within a range from 0.1% to 8.0% by weight, based on the total weight of the nail varnish formulation. Compensation to 100% by weight of the formulation can be effected with International Lacquers Nailpolish.

Phase A was mixed and added to phase B, and then the nail varnish was dispensed into an appropriate container.

Application Example 14: Aqueous Nail Varnish

The effect pigments from examples 1 to 7 and from example 9 can be used in an aqueous nail varnish according to WO 2007/115675 A2 example 1. The pigmentation level here is 0.1% to 10.0% by weight, based on the total weight of the formulation.

Application Example 15: Liquid Eyeshadow

| INCI name | Product name | % by wt. | Manufacturer/ supplier |
|---|---|---|---|
| Phase A | | | |
| Water | Aqua | 73.80 | |
| Glycerin | Glycerin | 3.00 | H. Erhard Wagner |
| Phase B | | | |
| PEG-800 | Polyglycol 35000 S | 0.60 | Clariant |
| Ammonium Acryloyldi- mehtyltaurate/ VP Copolymer | Aristoflex AVC | 0.80 | Clariant |
| Acrylates Copolymer | Worlee Micromer CEK 20/50 | 5.00 | Worlee |
| Phase C | | | |
| | Effect pigment from example 3 | 10.00 | |
| Divinyldimethicone/ Dimethicone Copolymer C12-C13 Pareth-3, C12-C13 Pareth-23 | Dow Corning HMW 2220 Non- Ionic Emulsion | 6.00 | Dow Corning |
| Phenoxyethanol, Ethylhexylglycerin | Euxyl PE9010 | 0.80 | Schülke & Mayr |

The effect pigment from example 3 can be used within a range from 0.10% to 20.00% by weight, based on the total weight of the eyeshadow formulation. Compensation to 100% by weight of the formulation can be effected with water.

Phase A was stirred, then the ingredients of phase B were added individually to phase A and stirred until the consistency was homogeneous. Thereafter, the ingredients of phase C were added individually to phase AB and the mixture was stirred until the consistency was homogeneous.

FIG. 1: Scanning electron micrograph of a transverse section of an effect pigment of the invention in 50 000-fold magnification (based on Polaroid 545)

Figure 2:
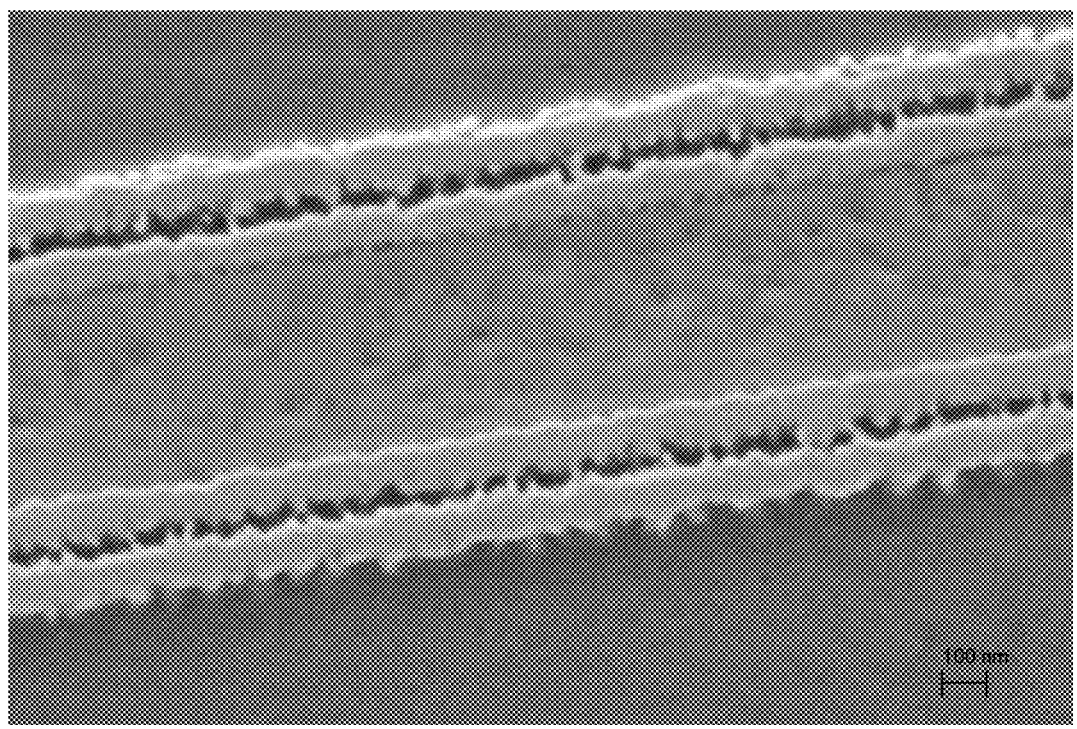
FIG. 2 is a scanning electron micrograph of a transverse section of an effect pigment of the invention in 50,000-fold magnification (based on Polaroid 545)

FIG. 2: Scanning electron micrograph of a transverse section of an effect pigment of the invention in 50 000-fold magnification (based on Polaroid 545)

Figure 3:
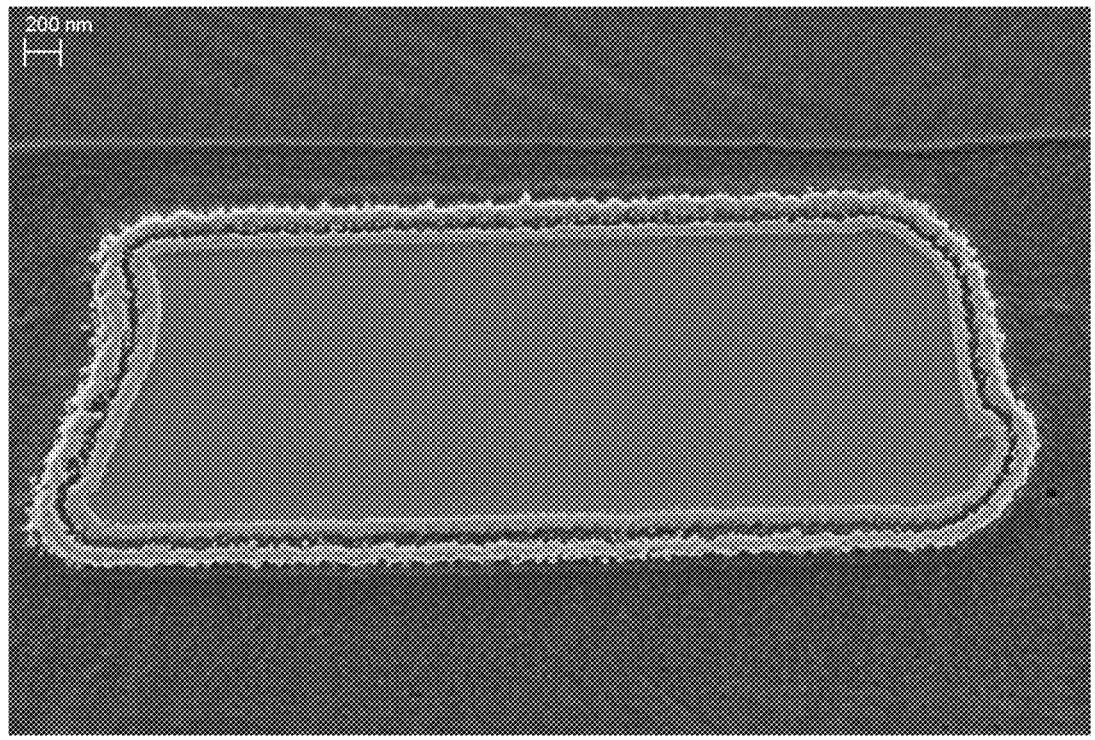
FIG. 3 is a scanning electron micrograph of a transverse section of an effect pigment of the invention in 20,000-fold magnification (based on Polaroid 545)

FIG. 3: Scanning electron micrograph of a transverse section of an effect pigment of the invention in 20 000-fold magnification (based on Polaroid 545)

FIG. 4: Detail of the scanning electron micrograph of a transverse section from FIG. 2 with a baseline drawn in at the interface of nonmetallic substrate in platelet form— coating, and lines arranged at right angles to the baseline. "x" marks the points of intersection at the interfaces.

FIG. 5: Scanning electron micrograph of a transverse section of the titanium dioxide-coated pearlescent pigment SYMIC C261 (from ECKART GmbH) in 20 000-fold magnification (based on Polaroid 545)

FIG. 6: Schematic diagram of the spacer layer

FIG. 7: Schematic diagram of the position of the spacer layer

FIG. 8: Concentration profile (line scan) using a transverse section in a scanning electron microscope with energy-dispersive microanalyzer (EDX) of example 9 prior to calcination FIG. 9: Concentration profile (line scan) using a transverse section in a scanning electron microscope with energy-dispersive microanalyzer (EDX) of example 9 after calcination.

The invention claimed is:

1. A gold-colored effect pigment comprising a nonmetallic substrate in platelet form and a coating applied to the substrate, wherein the coating comprises:
    a) optionally a layer 1 comprising or consisting of at least one of tin oxide, tin hydroxide or tin oxide hydrate,
    b) a layer 2 comprising at least one of metal oxide, metal hydroxide or metal oxide hydrate, where the metal ion comprises or is at least one metal ion selected from the group of metals consisting of Fe, Sn, Ti and Zr, and
    c) a layer 3 comprising at least one of metal oxide, metal hydroxide or metal oxide hydrate, where the metal ion comprises or is at least one metal ion selected from the group of metals consisting of Fe, Sn, Ti and Zr, at least one of layers 2 and 3 comprises at least two different metal ions and at least one of the two different metal ions is an iron ion, and layers 2 and 3 are interrupted by a spacer layer, wherein the spacer layer includes connections and cavities and wherein the spacer layer has a standard deviation of a relative height of $\sigma_{Rma}$ in a range of 0.2 to 18%, wherein the relative height $h_{Rma}$ is defined as a ratio of a height $h_{ma}$ to a layer thickness of an overall coating and $h_{ma}$ refers to a sum total of a layer thickness of optional layer 1, layer 2 and half of a mean height $h_a$ of the spacer layer.

2. The gold-colored effect pigment according to claim 1, wherein the mean height of the spacer layer $h_a$ is determined by the following method:
    the effect pigments are applied in a lacquer and cross sections are prepared and scanning electron micrographs analyzed thereof comprising the steps:
    establishing the upper and lower substrate surfaces as baselines which are the longer side of the nonmetallic substrate in platelet form in each case and drawing the baselines onto the scanning electron micrograph of the transverse section, analyzing the scanning electron micrographs of the transverse sections with the aid of AxioVision 4.6.3 image processing software, drawing a plurality of parallel lines at 50 nm intervals at a 90° angle with respect to the upper and lower baselines corresponding to the two surfaces of the substrate in platelet form establishing a grid over the effect pigment shown in the scanning electron micrograph of a transverse section using a magnification of at least 50 000-fold, based on Polaroid 545;

proceeding from the respective baseline of the nonmetallic substrate in platelet form, in the direction of the respective outer layer 3 or the respective outermost layer, the points of intersection between the parallel lines arranged at right angles to the respective baseline with the respective interfaces of the optional layer 1 with layer 2, of layer 2 with the spacer layer, of the spacer layer with layer 3, and of layer 3 with the environment or with any further layer applied are analyzed manually, wherein in the case that one of the lines drawn at 50 nm intervals occurs directly above a connection point or a spacer only the respective point of intersection of the line at the interface of layer 3 with the environment or with any further layer applied is recorded;

determining the layer thicknesses of layers 2 and 3, the layer thickness of the overall coating, the layer thickness of further layers optionally present, and the mean height $h_a$ of the spacer layer by formation of differences, wherein the layer thickness of layer 2 is calculated from the difference between the respective measured points of intersection at the respective interfaces of layer 2 with the spacer layer and of either optional layer 1 with layer 2 or the baseline with layer 2 if the nonmetallic substrate in platelet form has not been covered with further layers beforehand, and the layer thickness of layer 3 is calculated from the difference between the respective measured points of intersection of layer 3 with the environment or any further layer applied and of the spacer layer with layer 3 and the mean height $h_a$ of the spacer layer is calculated from the difference between the respective measured point of intersection of spacer layer with layer 3 and layer 2 with the spacer layer, wherein the mean height $h_a$ is determined by forming the arithmetic mean by conducting the method to at least 100 of the parallel lines arranged at right angles to the baselines.

3. The gold-colored effect pigment according to claim 1, wherein the standard deviation of the relative height $\sigma h_{Rma}$ is within a range from 0.3% to 15%.

4. A gold-colored effect pigment comprising a nonmetallic substrate in platelet form and a coating applied to the substrate, wherein the coating comprises
    a) optionally a layer 1 comprising or consisting of at least one of tin oxide, tin hydroxide or tin oxide hydrate,
    b) a layer 2 comprising at least one of metal oxide, metal hydroxide or metal oxide hydrate, where the metal ion comprises or is at least one metal ion selected from the group of metals consisting of Fe, Sn, Ti and Zr, and
    c) a layer 3 comprising at least one of metal oxide, metal hydroxide or metal oxide hydrate, where the metal ion comprises or is at least one metal ion selected from the group of metals consisting of Fe, Sn, Ti and Zr, at least one of layers 2 and 3 comprises at least two different metal ions and at least one of the two different metal ions is an iron ion, and layers 2 and 3 are interrupted by a spacer layer, wherein the spacer layer includes connections and cavities and wherein the spacer layer has a network density of <85%, wherein the network density is defined as the number of connections or spacers per number of lines in %, determined from a grid of parallel lines drawn at 50 nm intervals at a 90° angle from a baseline drawn onto each scanning electron micrograph of a transverse section along the surface of a longer side of the nonmetallic substrate.

5. The gold-colored effect pigment according to claim 4, wherein the network density of the spacer layer ranges from 1% to 75%.

6. The gold-colored effect pigment as claimed in claim 1, wherein the nonmetallic substrate in platelet form is selected from the group consisting of natural mica platelets, synthetic mica platelets, glass platelets, iron oxide platelets, $SiO_2$ platelets, $Al_2O_3$ platelets, kaolin platelets, talc platelets, graphite platelets, bismuth oxychloride platelets and mixtures thereof, and the nonmetallic substrate in platelet form has optionally been coated and calcined with at least one of metal oxide, metal hydroxide or metal oxide hydrate.

7. The gold-colored effect pigment as claimed in claim 1, wherein the effect pigment comprises further layers and at least one further spacer layer.

8. The gold-colored effect pigment as claimed in claim 1, wherein a proportion of iron oxide, iron hydroxide and/or iron oxide hydrate in the gold-colored effect pigment is within a range from 1% by weight to 45% by weight, determined by means of XRF, calculated in each case as the metal oxide and based on the total weight of the gold-colored effect pigment.

9. The gold-colored effect pigment as claimed in claim 1, wherein a proportion of metal oxide, metal hydroxide and/or metal oxide hydrate, where the at least one metal ion comprises or is a metal ion selected from the group of metals consisting of Sn, Ti and Zr, is within a range from 10% to 75% by weight in total and a proportion of iron oxide, iron hydroxide and/or iron oxide hydrate is within a range from 1.5% by weight to 25% by weight, determined in each case by means of XRF, calculated in each case as the metal oxide and based in each case on the total weight of the gold-colored effect pigment.

10. The gold-colored effect pigment as claimed in claim 1, wherein layers 2 and 3 do not include any tin oxide, tin hydroxide and/or tin oxide hydrate and a proportion of tin oxide, tin hydroxide and/or tin oxide hydrate in the gold-colored effect pigment is within a range from 0.01% by weight to 1.5% by weight, determined by means of XRF as tin dioxide and based on the total weight of the gold-colored effect pigment.

11. The gold-colored effect pigment as claimed in claim 1, wherein the spacer layer has a mean height $h_a$ in each case from a range from 5 nm to 120 nm.

12. The gold-colored effect pigment as claimed in claim 1, wherein the spacer layer is arranged essentially parallel to the surface of the nonmetallic synthetic substrate in platelet form.

13. The gold-colored effect pigment as claimed in claim 4, wherein the nonmetallic substrate in platelet form is selected from the group consisting of natural mica platelets, synthetic mica platelets, glass platelets, iron oxide platelets, $SiO_2$ platelets, $Al_2O_3$ platelets, kaolin platelets, talc platelets, graphite platelets, bismuth oxychloride platelets and mixtures thereof, and the nonmetallic substrate in platelet form has optionally been coated and calcined with at least one of metal oxide, metal hydroxide or metal oxide hydrate.

14. The gold-colored effect pigment as claimed in claim 4, wherein the effect pigment comprises further layers and at least one further spacer layer.

15. The gold-colored effect pigment as claimed in claim 4, wherein a proportion of iron oxide, iron hydroxide and/or iron oxide hydrate in the gold-colored effect pigment is within a range from 1% by weight to 45% by weight, determined by means of XRF, calculated in each case as the metal oxide and based on the total weight of the gold-colored effect pigment.

16. The gold-colored effect pigment as claimed in claim 4, wherein a proportion of metal oxide, metal hydroxide and/or metal oxide hydrate, where the at least one metal ion comprises or is a metal ion selected from the group of metals consisting of Sn, Ti and Zr, is within a range from 10% to 75% by weight in total and a proportion of iron oxide, iron hydroxide and/or iron oxide hydrate is within a range from 1.5% by weight to 25% by weight, determined in each case by means of XRF, calculated in each case as the metal oxide and based in each case on the total weight of the gold-colored effect pigment.

17. The gold-colored effect pigment as claimed in claim 4, wherein layers 2 and 3 do not include any tin oxide, tin hydroxide and/or tin oxide hydrate and a proportion of tin oxide, tin hydroxide and/or tin oxide hydrate in the gold-colored effect pigment is within a range from 0.01% by weight to 1.5% by weight, determined by means of XRF as tin dioxide and based on the total weight of the gold-colored effect pigment.

18. The gold-colored effect pigment as claimed in claim 4, wherein the spacer layer has a mean height $h_a$ in each case from a range from 5 nm to 120 nm.

* * * * *

UNITED STATES PATENT AND TRADEMARK OFFICE
CERTIFICATE OF CORRECTION

PATENT NO. : 10,947,391 B2
APPLICATION NO. : 15/536364
DATED : March 16, 2021
INVENTOR(S) : Michael Grüner et al.

Page 1 of 1

It is certified that error appears in the above-identified patent and that said Letters Patent is hereby corrected as shown below:

In the Claims

Column 52, Line 55, Claim 1, delete "$\sigma_{Rma}$" and insert -- $\sigma h_{Rma}$ --

Signed and Sealed this
Twenty-fourth Day of August, 2021

Drew Hirshfeld
*Performing the Functions and Duties of the*
*Under Secretary of Commerce for Intellectual Property and*
*Director of the United States Patent and Trademark Office*